April 5, 1966 W. A. HICKOX 3,244,898
POWER PLANT SYSTEM AND CONTROL THEREFOR
Filed Dec. 29, 1959 8 Sheets-Sheet 1

INVENTOR
Walter A. Hickox
BY
Eldon H. Luther
ATTORNEY

INVENTOR
Walter A. Hickox
BY
Eldon H. Luther
ATTORNEY

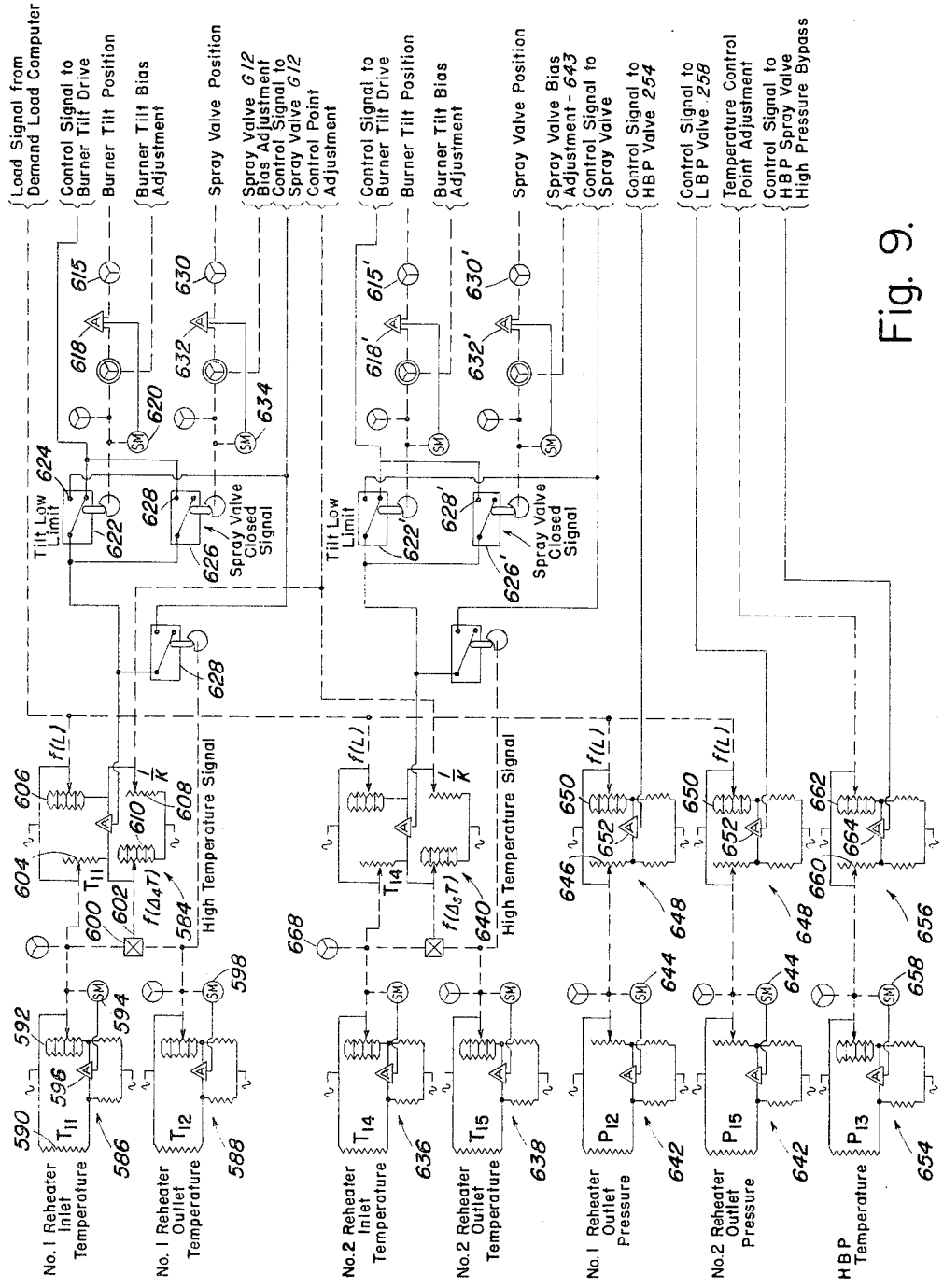

United States Patent Office 3,244,898
Patented Apr. 5, 1966

3,244,898
POWER PLANT SYSTEM AND
CONTROL THEREFOR
Walter A. Hickox, Glen Cove, N.Y., assignor to Combustion Engineering, Inc., New York, N.Y., a corporation of Delaware
Filed Dec. 29, 1959, Ser. No. 2,562
41 Claims. (Cl. 290—2)

This invention relates generally to electric generating power plant systems employing a number of separate but electrically interconnected power plants and wherein each of the power plants includes a turbo-generator which is supplied with steam by means of an associated and accompanying steam generator with the invention being particularly related to an improved control system incorporated into such a power plant arrangement.

In accordance with the invention, the system for control employs a number of computer controls and the entire control system is integrated so that a sensitive and fast responding control of the power plant is achieved. The various parameters which must be controlled in the steam generator and which vary in accordance with load on the power plant, such as feedwater flow, steam temperature, and the like, are effectively controlled in response to the "demand load" on the power plant with the various computer portions of the control that are associated with and effective to control these parameters responding to the "demand load" which itself is continuously determined by means of a demand load computer. It is accordingly the general approach of the control system that for a given change in demand load either scheduled or nonscheduled, the required parameters of the steam generator are computed and applied immediately to the system by means of the controls. The control system of the invention is electric in nature and the various computer portions of the control are analog-type computers.

Not only are various parameters of the steam generator which vary in accordance with load controlled in response to the demand load but the control organization is such that the feedback for the various control organizations, is, in fact, the parameter that is controlled and with a continuous control signal being produced whenever the parameter is at variance with the value which it should have in accordance with the value as determined by the computer control for the particular "demand load" of the power plant at the time.

It is the object of this invention to provide an improved power plant system and control.

It is a further object of this invention to provide an improved control system which employs computers to continously determine the various controlled parameters of the steam generator which vary with load, with these parameters being determined in accordance with demand load on the plant.

Another object of the invention is the provision of an electric power plant system which continously determines the demand load on the plant and controls various parameters of the steam generator in accordance therewith.

A still further object is the provision of an electric power plant system employing analog computer means for continuously providing control signals for the various controlled elements of the steam generator.

Other and further objects of the invention will become apparent to those skilled in the art as the description proceeds.

With the aforementioned objects in view, the invention comprises an arrangement, construction and combination of the elements of the inventive organization and method in such a manner as to attain the results desired as hereinafter more particularly set forth in the following detailed description of an illustrative embodiment, said embodiment being shown by the accompanying drawings wherein FIGS. 1A and 1B are diagrammatic representations of a basic aspect of conventional control practice and the basic control concept of the invention, respectively;

FIG. 5A is a circuit diagram showing a modification of a portion of the feedwater computer subsystem of FIG. 5;

FIG. 9 is a circuit diagram showing the elements and the construction of the reheater computer subsystem.

The control organization of the present invention involves a basic departure from control systems for power plants as conventionally organized and operated. This basic departure involves maintaining the process that is controlled within, and a portion of the control loop rather than keeping the control loop separate from this process, as is now the practice. In the conventional arrangement, the control loop is separate from the process that is controlled and in these systems the sensor or measuring elements transmit a signal, hydraulic or electric, proportional to the difference of the desired value and the actual value and the controller computes the required reaction and monitors the reaction. If the desired value is not obtained, this process is repeated until a minor error signal is received by the controller. Such a system has inherently poor response and in most cases function generation is required in order to maintain stability and accommodate unnatural feedback functions. This conventional system may be termed the "separate loop system."

In contrast to this separate loop system, the system of the present invention employs what may be termed the "process loop system" wherein the actual process that is controlled is a part of the control loop. In this process loop system the sensor or measuring element transmits a signal proportional to the error, the controller or amplifier sends a signal to the control element (valve) which causes it to either open or close depending upon the sense of the error signal, at a rate consistent with the dynamics of the system and monitors the original error signal. The controller will cause the control element to function until the variable to be controlled reaches its desired value and thus the system becomes part of the control loop.

Figure 1A:
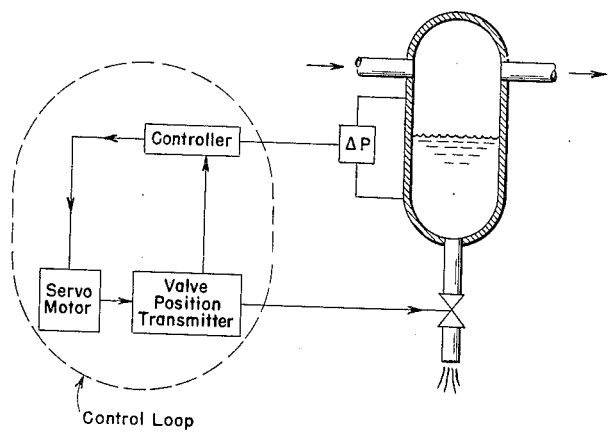
Figure 1B:
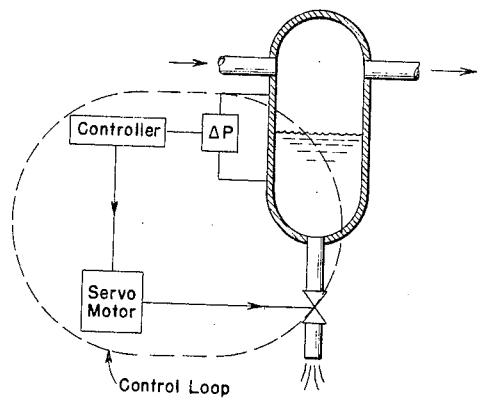

The difference between the "separate loop system" and the "process loop system" will be made clear by reference to FIGS. 1A and 1B. FIG. 1A depicts the conventional "separate loop system" and in this arrangement a change in water level produces a change in differential pressure ($\Delta P$), the controller detects an error signal and determines or computes a change in valve position, and a servomotor drives the valve to the position called for by the controller. If the flow characteristics of the valve are not quite according to specifications the process will be repeated when the error signal again builds up. In contrast to this arrangement, in the system of FIG. 1B, i.e., the process loop system, the controller detects an error signal and this error signal is continuously applied to the valve operator to open or close the valve until the error is reduced to zero. This system is only moderately affected by valve characteristics and its response can be as good as possible with the inherent system dynamics. In the system of FIG. 1A, the feedback is the valve position, while in the system of FIG. 1B the feedback is the actual parameter that is being controlled. The advantages of the "process loop system" as compared with the "separate loop system" can be more fully appreciated by further examining the operation of these systems. With regard to the "separate loop system"

Let $X$ = variation in process parameter from set point error signal)
and $p$ = change required in control element position to return process to control point.

Since the primary feedback is control element position the following relationship must be established:

(1) $$X = f(p)$$

then the expression for final control element position change becomes (2) $$p = \underbrace{k_1 \cdot f(p)}_{\substack{\text{Proportional} \\ \text{Action}}} + \underbrace{k_1 \cdot k_2 \int f(p)\,dt}_{\substack{\text{Reset} \\ \text{Action}}} + \underbrace{k_3 \cdot k_1 \frac{d}{dt} f(p) \cdot f(p)}_{\substack{\text{Rate} \\ \text{Action}}}$$

This is the optimalized equation of a 3-action position adjusting type controller will solve for the new control element position, where $k_1$ = Proportional Band Adjustment
$k_2$ = Reset Adjustment
$k_3$ = Rate Adjustment However, the above equation actually represents a continuous function where actually the controller generates a discontinuous one by means of the intermittent reset action. Even though at any time the error in control element position due to this approximation is significant it will be neglected in order to simplify the analysis. By partial differentiation (3) $$\delta p = k_1 \cdot \delta f(p) + k_1 \cdot k_2 \delta \int f(p)\,dt + k_3 \cdot k_1 [f'(p) \cdot f(p)]$$

Assume a disturbance occurred and the controller returned the process to the control point in such a manner as to fulfill the following conditions:

When $t = t_1$, $X = 0$
and $t_1 = nk_2$ where $n$ is an integer

Since $X = 0$ the first and third terms of Equation 2 will drop out, the second term denoting the net change in control element position. Assuming further a perfect controller, that is, it removed all of the rate action and proportional action it put in, then the first and third terms in Equation 3 can also be neglected and the error in control element position due to an error in $f(p)$ becomes (4) $$\delta p = k_1 \cdot k_2 \delta \int f(p)\,dt$$

This states that the control element position error is a function of proportional band adjustment, reset adjustment, function or "characterizing" error and the time the process was off the control point. It now becomes quite obvious that such a control system will continuously adjust the control element position even if the process is in a steady state condition.

Considering now the "process loop" system if:

$X$ = variation in process parameter from set point (error signal)
$p$ = change required in control element position to return process to control point.

Since the primary feedback is the error signal itself the following relationship is required to be established (5) $$p = f_1(X)$$

which is defined as a single valued function with a zero intercept disregarding dead band.

Also since control element position is not used for feedback no convenient method exists for producing a signal equivalent to proportional action as above. Therefore the control element position is defined as follows:

(6) $$p = \underbrace{k_4 \cdot \int f_1(X)\,dt}_{\substack{\text{Integral} \\ \text{Action}}} + \underbrace{k_5 \cdot \frac{d}{dt} f_1(X)}_{\substack{\text{Rate} \\ \text{Anticipation}}}$$

which is a continuous function and is directly applicable to controller action.

By partial differentiation (7) $$\delta p = \delta \int f_1(X)\,dt + k_5 \cdot \int \frac{d}{dt} f_1(X)$$

Again assume that a disturbance occurred and the control returned the process to the control point.

Since $X = 0$ the second term of Equation 6 drops out, the first term denoting the net change in control element position, and the first term in Equation 7 is an expression for the error in control element position. Therefore $f_1(X) = 0$ by definition and the error in control element position is also zero. With regard to the "process loop" system the time constant for the particular control arrangement must not be excessive since the settling time for the control would then be prohibited. Accordingly the control organization of the invention is applied to the steam generator of the power plant with the control points selected so that time constants are maintained at a minimum.

Figure 2:
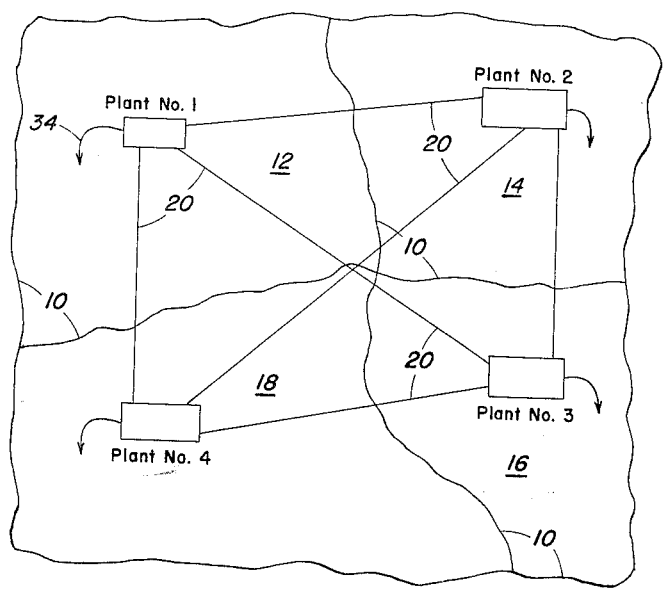
FIG. 2 is a diagrammatic representation of a power plant system with which the present invention is concerned.

An electric power plant system consists of a number of separate power plants, as shown in FIG. 2 with the power plants in this figure being identified as plants Nos. 1, 2, 3 and 4. Each of these separate power plants comprises one or more steam generator, turbo-generator units. Each plant is primarily responsible for supplying the electrical load of its own area. In the illustration of FIG. 2, each of the plant areas is outlined by means of the boundary lines 10 with the area for plant 1 being identified as 12, the area for plant 2 being identified as 14, that for plant 3 as 16, and that for plant 4 as 18. Each of the plants is interconnected by a tie-line 20 so that there may be an interchange of power from one plant to another. This power interchange among the various plants is scheduled, or in other words, is determined by a central dispatcher for the entire plant system. When a load change occurs in the area in any one of the plants the control organization of the invention as applied to each plant will determine whether the load change occurred within the area of the particular plant, or in other words, whether the "demand load" of the plant has changed with demand load referring to the load which is required to be supplied by the particular plant. Each plant is charged with and primarily responsible for meeting load changes in its own area. Therefore when a load change in an area of one plant occurs that particular plant should accommodate this change in load and the interchange between the various plants should remain the same providing the central dispatcher does not alter the interchange.

Figure 3:
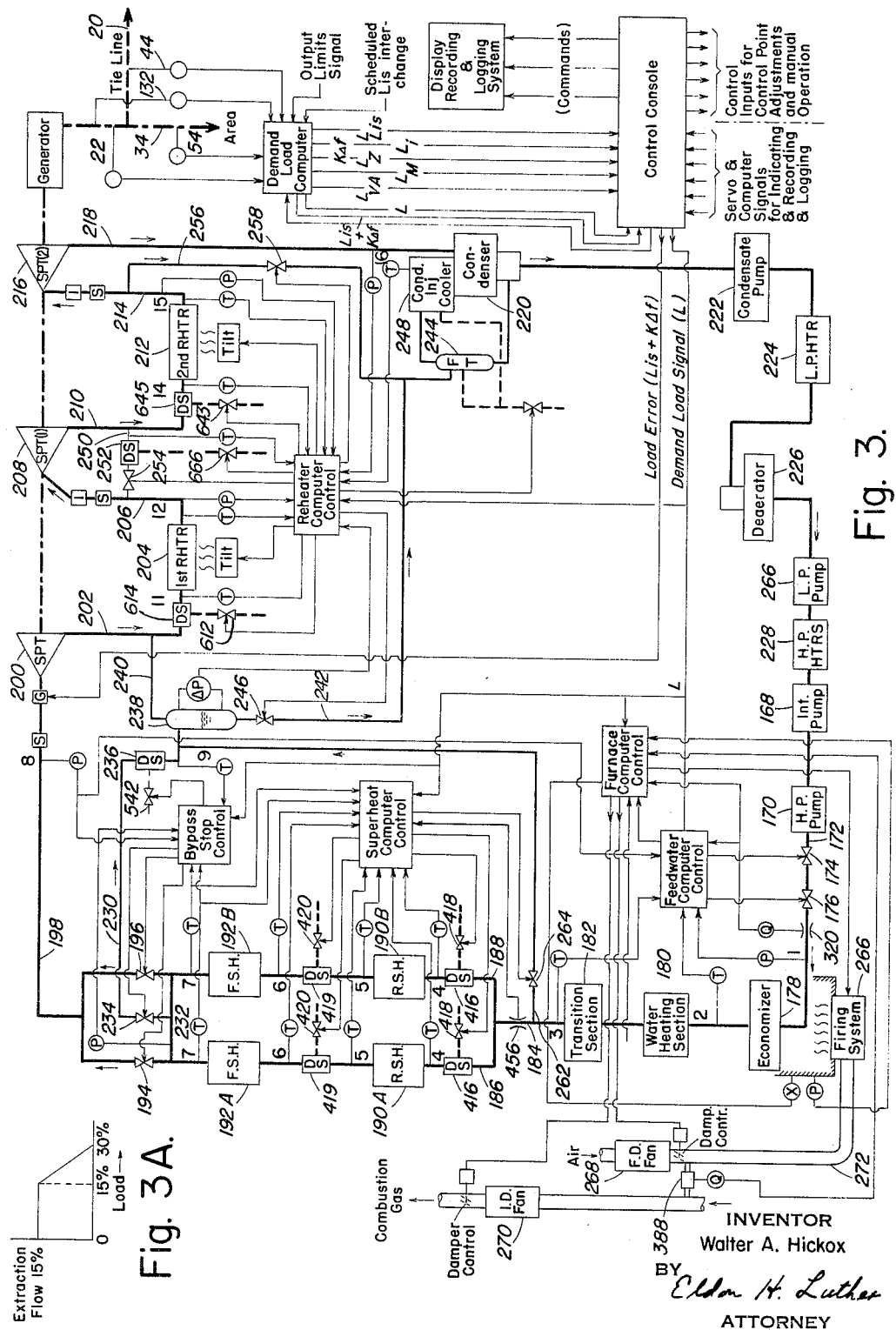
FIG. 3 is a schematic representation in the nature of a flow chart showing the organization of one of the power plants of FIG. 2 and the control applied thereto.
Figure 4:
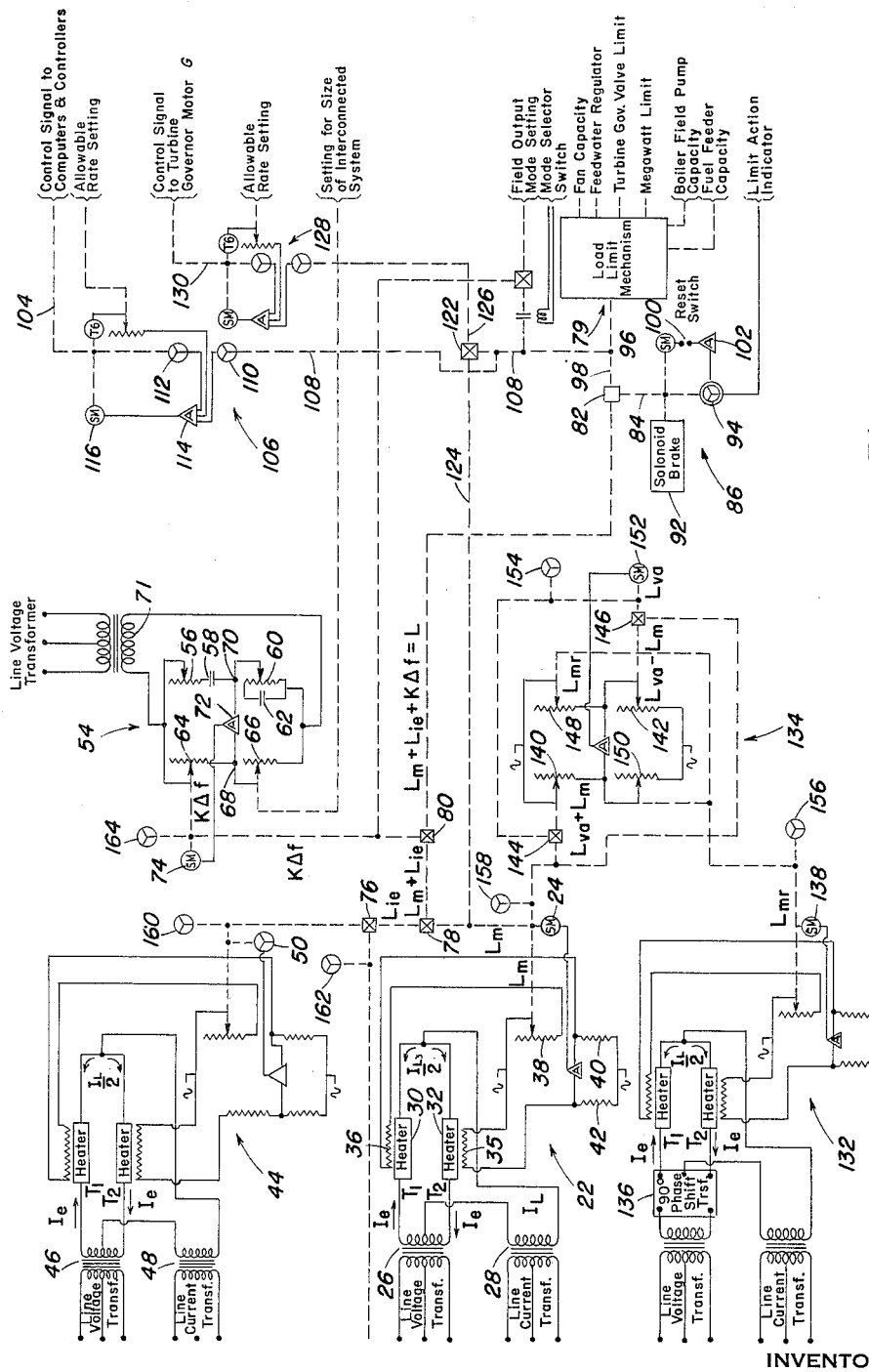
FIG. 4 is a circuit diagram showing the elements and the construction of the demand load computer subsystem.

The demand load computer subsystem diagrammatically depicted in FIG. 3 and schematically represented in greater detail in FIG. 4 determines when the demand load for the particular power plant has changed. This demand load computer subsystem in one portion of the computer setup for the entire control system and this demand load computer is effective to provide an output signal which is a function of the demand load on the power plant. This demand load computer sub-system (FIG. 4) includes a self-balancing Wheatstone bridge network 22 the rebalancing servomotor 24 of which provides a signal which represents the actual generator output identified as $L_M$, with this generator output, $L_M$, being the resistive load on the generator as distinguished from the reactive load. The bridge network 22 includes potential or voltage transformer 26 and line current transformer 28 interconnected as shown to supply power to the heaters 30 and 32. The transformers 26 and 28 are connected into the area supply line 34 (FIGS. 2 and 3) which supplies power to the particular area for which the plant is responsive. The current output of transformer 26, identified as $I_e$, is proportional to the line voltage of the area supply line 34 and the current output of transformer 28 identified as $I_L$ is proportional to the line current. The heaters 30 and 32 which are, of course, electrical are constructed so that their resistance is equal and does not substantially vary with temperature. The current flow through heater 30 is $$I_e - \frac{I_L}{2}$$

and the current flowing in the heater 32 is $$I_e + \frac{I_L}{2}$$

The heat generated in the heaters is proportional to $I^2R$ where R is the resistance of the heater and therefore the temperature measured at these heaters is also proportional to the generated heat. The temperature difference therefore can be represented as follows:

$$T_2 - T_1 = kR\left(I_e + \frac{I_L}{2}\right)^2 - \left(I_e + \frac{I_L}{2}\right)^2$$

Since the heater resistances are equal $$T_2 - T_1 = kR\left[I_e^2 + I_eI_L + \frac{I_L^2}{4} - I_e^2 + I_eI_L - \frac{I_L^2}{4}\right]$$

or $$T_2 - T_1 = kR(2I_eI_L)$$

and since $I_eI_L$ is proportional to power then $$L_M = k_2(T_2 - T_1)$$

where $L_M$ = Generator output; rearranging $$K_2T_1 + L_M = k_2T_2$$

Therefore, if one arm of the bridge contains a resistance proportional to $T_2$, the second arm contains a resistance proportional to $T_1$ plus a potentiometer driven by a servo to rebalance the bridge and the third and fourth arms contain fixed resistors, at balance the above equation is satisfied and the servomotor output is proportional to generator output. Such is the case with bridge network 22 with resistance 35, which varies proportional to the temperature of heater 32, being in the first arm of the Wheatstone bridge and resistance 36, which varies proportional to the temperature of heater 30, being in the second arm. Potentiometer 38 is also positioned in this second arm of the bridge and is adjusted by servomotor 24 to rebalance the bridge. Resistances 40 and 42, which are fixed, are connected in the third and fourth arms respectively of this bridge and accordingly the output of servomotor 24 is proportional to the resistive load ($L_M$) supplied by the generator.

The actual interchange ($L_1$), i.e., the power supplied through the tie line 20 from the plant to the other plants or the power supplied to the plant through this tie line from the other plant is determined by means of bridge network 44 which is generally similar to the network 22. In this network 44 the line voltage and line current transformers 46 and 48 are associated with the tie line 20 and not with the area line 34. The connection of the transformers into the bridge, the disposition of the heaters and the resistances adjacent thereto in bridge 44 is the same as that of bridge 22. Since the power flow with regard to the interchange, i.e., the power flow through the tie line 20 may be either into or out of the particular plant so that the sign of the temperature difference in the foregoing equation changes and since it is necessary to distinguish the direction of interchange, it is necessary that the rebalancing servo 50 for this interchange network 44 distinguish the direction in which the power is flowing.

In the equation:

$$K_2T_1 + L_M = k_2T_2$$

If $T_1$ is greater than $T_2$ then in order to balance the bridge a negative $L_M$ must be generated indicating a flow of power in the opposite direction to that originally established. Since the analog is a resistance a negative $L_M$ is impossible and we must find other means of generating the above quantity. This is done in network 44 by suitable scaling in the following relationship between $L_M$ and resistance:

The resistance equivalent to $L_M = k_3 \cdot L_M + R_B$. $R_B$ being added to the first arm of network 44.

Clearly now when $$L_M = 0; R = R_B$$
$$L_M > 0; R > R_B$$
$$L_M < 0; R < R_B$$

Where

R is the total resistance in the second arm of the bridge.

This is accomplished by merely establishing the zero of the potentiometer $R_B$ ohms from the appropriate stop and adding an equal resistance to the other bridge arm. This expedient now provides a servo output which is indicative of both direction and magnitude of power flow and provides a suitable signal proportional to $L_1$. If more than one tie line exists the resistance type temperature elements are merely connected in series and totalizing is accomplished by the same servo balanced bridge.

Accordingly, the output of servomotor 50 of bridge 44 represents or is a function of the interchange or interchange power with this being identified as $L_i$ in the diagram of FIG. 4.

In addition to the bridge networks 22 and 44 there is provided a bridge network 54 which provides an output that is a function of the change in frequency of the entire power plant system. This frequency network is in the form of impedance bridge with the second arm of the bridge containing a fixed resistance 56 and capacitance 58 in series while the third arm contains resistance 60 and capacitance 62 in parallel. The first arm of the bridge contains a servomotor driven potentiometer 64 which maintains the bridge in balance and the fourth arm contains a manually adjustable potentiometer 66. In this bridge a frequency change in the power plant system which results from a change in load somewhere in the system results in a change in impedance ratio between the second and third arms of the bridge thereby creating an unbalance in the bridge across the null or midpoints 68 and 70 with the bridge network containing the secondary 71 of a transformer that may be disposed in either tie line 20 or area line 34. The null detector amplifier 72 energizes rebalancing servomotor 74 which re-positions potentiometer 64 to rebalance the bridge. The change in servomotor shaft position is therefore a function of frequency change. The manually adjustable potentiometer is used to provide the proper relationship between frequency error and interconnected system load change. The frequency function actually is of the form $$R = k_2 \cdot \Delta f - \frac{k_2}{f^2} \cdot \Delta f$$

which is not the linear relationship asumed, however, it can be readily seen that the error introduced, if the frequency change is one cycle, is only one part in 3600 which can be neglected especially since the use made of the frequency signal is anticipatory and damps out when steady state conditions are achieved.

Accordingly by means of the bridge networks 22, 44 and 54 and particularly the rebalancing servos of these bridges, signals are provided which represent a function of the actual load on the generator or output of the generator, with this signal ($L_M$) being the shaft position of servomotor 24, a function of the interchange of the particular plant, with this signal ($L_i$) being the shaft position of servomotor 50, and a function of the frequency error for the entire power system, with this being the shaft position of servomotor 74 and with this signal being identified as $k\Delta f$.

There is one other signal that is provided for use in the demand load computer subsystem and this is scheduled interchanged and this signal is identified as $L_{is}$. The scheduled interchange is the interchange power which the dispatcher determines shall be sent from or sent to the particular plant. These four (4) signals, i.e., $L_M$, $L_i$, $L_{is}$, and $k\Delta f$ are combined to provide an output signal which is a function of the demand load on the plant with demand load being defined as the load which the particular plant must meet. As previously mentioned, the plant must take care of load changes in its own area and must maintain the scheduled interchange. When there is a change in load somewhere in the system of the four power plants, this demand load computer control system must determine whether the change was in the area of the particular plant of this control system or whether it was in the area of one of the other plants. If it was in the area of the particular plant of the control system the demand load on the plant will change while if it was outside the area of the plant the demand load on the plant does not change.

In making this determination the computer subsystem combines the signals $L_i$ and $L_{is}$ in the mechanical differential 76 so that the output of this differential is a function of the difference between these two signals, or in other words, a function of the interchange error with this error signal being identified as $L_{ie}$. When the scheduled interchange $L_{is}$ equals the actual interchange as determined by the bridge network 44 and identified as $L_i$ the interchange error will of course be zero.

The output of differential 76, or the interchange error signals $L_{ie}$, is combined with the generator output $L_M$ in the differential 78 with the output signal of this differential being identified as $L_M$ plus $L_{ie}$. This signal is combined with the output of servomotor 74, or the $k\Delta f$ signal in the differential 80 with the output of this differential being the demand load L and with this demand load being defined as $L_M + L_{ie} + k\Delta f$.

The error signal $L_{ie}$ and the frequency error $k\Delta f$ are proportional or of equal magnitude so that these signals when combined in the differential 80 either cancel or add to each other and with this being determined by the relative sense or sign of the interchange and frequency errors. Under transient conditions if the load on the power plant system increases the frequency will decrease and if this load change is in the area of the particular power plant of the control system the interchange error, i.e., the change in interchange power, will be into the power plant, or, in other words, the change in interchange will be positive. If the load change is not in the area of the plant the change in the interchange will be out from the plant or will be negative. If the load on the entire power plant decreases so that the frequency increases giving a positive frequency error the change of the interchange will be out from the plant or negative if the load change is in the area of the plant while if the decrease in load is outside the plant the change in the interchange will be into the plant or positive. Accordingly, by combining the interchange error and the frequency error signals in the manner described a signal representing demand load is provided.

It should be noted that the constant $k$ in the signal $k\Delta f$ is defined as the ratio of station capacity to total interconnection system capacity and the term $k\Delta f$ is provided only for the intelligence necessary for discriminating between load changes in the area of the plant and outside the area of the plant.

In the operation of the portion of the demand load computer thus far described the output L of the differential 80 represents demand load and it is the object of the entire control system of the invention to make this demand load L equal $L_M$ this latter being the output of the generator. When the load changes on the power plant system, $L_M$ does not change but $L_i$, the interchange signal and $k\Delta f$ the frequency signal each change. If the load change is in the area of the plant the demand load ($L_M + L_{ie} + k\Delta f$) changes, with $L_{ie}$ and $k\Delta f$ being added as received by the differential 80. This demand load signal is then employed in the computer control system of the invention to control the various parameters of the steam generator. If this load change is not in the area which is served by the plant the demand load does not change but $L_{ie}$ and $k\Delta f$ are of such relative magnitude and are subtractive as received by the differential 80 so that they effectively cancel each other. In this way a control signal is provided which is a function of the demand load on the plant.

This demand load signal L will normally be the signal which is transmitted to the control system of the power plant for normal operation. However, the boiler feed pumps, forced draft fans, fuel feeders and other power plant equipment which are regulated in the control of the power plant have upper capacity limits which cannot be exceeded and accordingly a load limit device or mechanism identified generally as 79 is operative to limit the demand load signal so that it does not require the capacities of these power plant elements to exceed their allowable limits. The limiting actions of these various elements are all of the non-cumulative type and in order to provide for simple, reliable logic, the use of a mechanical double washer stack type limit stops may be provided in the load limit device 79 with these stop arrangements being well known. The inputs to the load limits can be either manual or servo driven depending upon the degree of automation desired. If the demand load signal L from the differential 80 exceeds one of the limits established in the load limit device the excess signal spills out through the mechanical differential 82. The shaft 84 of this differential 82 is connected with a memory circuit identified generally as 90 and which includes a solenoid brake 92 applied to shaft 84 with synchro 94 connected with this shaft and servomotor 96 also being connected with this shaft. The operation is such that the spill over signal rotates shaft 84 with the purpose of solenoid brake 92 being to supply sufficient resistance to this rotation so that the shaft normally remains stationary and is rotated only when shaft 98 is prevented from rotating by load limit device 79. Rotation of shaft 84 changes the position of the rotor of synchro 94 and accordingly develops a voltage across this rotor. Switch 100 is normally open so that this voltage merely remains impressed across the rotor. When the limiting action of the load limit device 79 is removed so that the differential 80 may drive right through the differential 82, shaft 84 is no longer rotated. However, in order to have the position of shaft 98 represent the demand load signal the spill over into the memory circuit must be returned to shaft 98. This is effected by closing the switch 100 whereupon the voltage impressed across the rotor of synchro 90 is effective through amplifier 102 to rotate the servomotor 96 which in turn rotates shaft 84, returns the rotor of the synchro to its initial position and imparts the movement initially imparted to shaft 84 back to the shaft 98.

The demand load signal L is applied to the various portions of the control system through the shaft 104 with this signal being applied to this shaft through the repeater servo 106 which receives its signal from shaft 108 that is in turn connected with the shaft 98. This repeater servo is comprised of the synchros 110 and 112 and placed in back-to-back relation and interconnected by amplifier 114. Synchro 110 is driven by shaft 108 while synchro 112 is driven by shaft 104. The output of amplifier 114 which amplifier is connected between these synchros is applied to servomotor 116 which drives the shaft 104 and also drives the tachometer 118. This tachometer generates a signal which is proportional to its speed of rotation and this signal is applied through adjustable resistance 120 back to the amplifier to reduce the signal output thereof. Accordingly, the speed with which the shaft 104 is rotated is regulated and governed by this repeater servo organization. This adjustment and governing of the rate of change of the demand load signal is necessary since it would otherwise be so rapid that it could not be tolerated.

This demand load computer subsystem in addition to providing a signal which is a function of the demand load L also provides a signal which is a function of the load error ($L_{\text{ie}}$ plus $k\Delta f$). For this purpose there is provided intermediate the two portions of shaft 108 the mechanical differential device 122. This means differential is connected with the output shaft of servomotor 24 by means of shaft 124 and is connected at its lower end to shaft 108 whereby the input to the differential is a function of the generator output $L_M$ (shaft 24) and is a function of demand load ($L = L_M + L_{\text{ie}} + k\Delta f$). The differential 122 is effective to subtract $L_M$ from this demand load so that the output shaft 126 is moved to provide a signal that is a function of the load error ($L_{\text{ie}} + k\Delta f$). This output shaft 126 is connected with a repeater servo organization 128 identical with that to which shaft 108 is connected and which is effective to regulate the speed or rate of change of the load error output through shaft 130.

In addition to providing an output signal that is a function of demand load and an output signal that is a function of load error the demand load computer subsystem provides an output signal to indicate the total load on the generator, i.e., both the resistive load and the reactive load. As previously mentioned, the bridge network 22 is responsive only to the resistive load. The indication of total load is provided by means of the bridge network 132 and the bridge network 134. Network 132 is similar to the previously described network 22 with this network employing a self-balancing Wheatstone bridge. However, network 132 differs from the previously described network 22 in that it contains phase shifting transformer 136 in order to respond to the reactive load component of the generator load and servomotor 188, which is a rebalancing servo for bridge network 132, provides an output signal ($L_{\text{MR}}$) for the bridge network which is a function of the reactive load. Accordingly, the output of bridge network 22 provides a signal that is a function of the resistive load and the output of bridge network 132 provides a signal that is a function of the reactive load wherefore it is only necessary to obtain the vector sum of the reactive and resistive load to obtain the total load and the bridge network or resolving zero 134 effects this result, with the vector sum being identified as $L_{VA}$. The first and third arms of the bridge network contain potentiometers positioned such that their resistance are proportional to $L_{VA} - L_M$ and $L_{VA} + L_M$, respectively with this result being effected by differentials 144 and 146, respectively. The second and fourth arms of the bridge networks contain potentiometers 148 and 150 which are positioned so that their resistances are proportional to $L_{\text{MR}}$, the reactive load. Servomotor 152 is responsive to the unbalance of the bridge and is operative to rebalance the bridge with this servomotor adding and subtracting equal resistances from the first and third arms to rebalance the bridge so that balance $$\frac{L_{VA} - L_M}{L_{\text{MR}}} = \frac{L_{\text{MR}}}{L_{VA} - L_M{}^2}$$

or $$L_{VA}{}^2 - L_M{}^2 = L_{\text{MR}}{}^2$$

or $$L_{VA} = \sqrt{L_M{}^2 + L_{\text{MR}}{}^2}$$

which is the equation we want to solve for $L_{VA}$, and therefore servomotor 152 shaft position is proportional to $L_{VA}$. Synchro 154 is connected with the output shaft of servomotor 152 to provide an electrical signal for a remotely disposed indicator-recorder.

Synchros 156, 158, 160, 162 and 164 are similarly provided in order to produce electrical signals for indicating the reactive load, the resistive load, the scheduled interchange, the actual interchange and the frequency error, respectively.

It will thus be apparent that the demand load computer subsystem of the control system of the invention is effective to provide an output signal which is a function of the demand load on the plant with this computer subsystem responding to electrical characteristics of the plant and the entire power plant system. These output signals that are proportional to the demand load are used throughout the control system and are essential input intelligence to many of the other computer subsystems which are effective to regulate the operation of the steam generator of the plant in order that the power output of the plant will equal the demand load. Having described the demand load computer subsystem, attention may now be directed to the details of the power plant, i.e., the steam generator and turbine arrangement and the portions of the associated and interconnected control system to control the operation of the power plant.

Referring to FIG. 3 there is diagrammatically represented in this figure a modern high capacity once-through steam generator operating at supercritical pressure. This steam generator includes low pressure pump 266, intermediate pressure pump 168 and high pressure pump 170 which are in series flow arrangement, as shown, and are effective to pump the water or heated fluid through the steam generator with the water leaving the final pump stage 170 through the conduit 172. The water from this conduit 172 passes through pressure regulator 176 and into economizer 178. From the economizer the water passes through the water heating surface 180 and then to the transition section 182 where the water is changed to steam. From the transition section the steam passes through conduit 184 and is then divided so as to provide two streams one passing through conduit 186 and the other through conduit 188 with the steam in each of these conduits passing first through an initial or radiant superheater section with this superheater section associated with conduit 186 being identified as 190A and that associated with conduit 188 identified as 190B. From these reheater sections the steam is conveyed through finishing superheater sections respectively identified as 192A and 192B. The steam from these sections then passes through turbine stop valves 194 and 196 and then through steam line 198 to the high pressure turbine 200. From this high pressure turbine the steam is conveyed through line 202 to the first reheater 204 with this reheater forming a portion of and being a part of the heat exchange surface of the steam generator. From this reheater 204 the then reheated steam is conveyed through line 206 to intermediate pressure turbine 208. From this intermediate pressure turbine the steam is conveyed through line 210 to the second reheater 212 which is also a part of the heat exchange surface of the steam generator. From this second reheater, the steam is conveyed through line 214 to the low pressure turbine 216 and from this low pressure turbine the steam is conveyed through line 218 to condenser 220. The condensate from this condenser is successively passed through condensate pump 222, low pressure heater 224, deaerator 226 and the previously identified feedwater pump stages with high pressure heater 228 being provided intermediate the low pressure pump 166 and the intermediate pressure pump 168.

Under normal operation the steam passing through steam line 198 to the high pressure turbine is maintained at a constant temperature and a constant or programmed pressure notwithstanding that the load may vary over a wide range and the control system of the invention is effective to control the steam generator in this regard. The steam supplied to intermediate pressure turbine 208 through line 206 is maintained at a constant temperature but its pressure will vary in a predetermined manner in accordance with the demand load on the unit and likewise the steam supplied to low pressure turbine 216 will be at a constant temperature but will also vary with load and with the control system of the invention controlling the steam temperature and pressure in this regard. Special consideration and operations are necessary in initiating operation of this supercritical once-through boiler, i.e., initially firing it and bringing the power plant on the line, and also in operating it at relatively low loads, as for example, loads below 30% of the maximum load of the unit, with the control system controlling the unit as required.

At low load operation it is necessary to circulate an amount of water through the economizer, water heating surface and the transition section substantially in excess of that required for the particular load. Thus when operating at 15% load the water circulated through these sections may be that required for 30% load. In such case it is, of course, necessary to provide a bypass arrangement for bypassing the excess steam flow around the turbines. This bypass arrangement includes line 230 which is connected with the outlets of the superheater sections 192A and 192B by means of connecting conduit 232. Disposed within the line 230 is the bypass control valve 234 and this line 230 is connected with desuperheater 236 and then with the separating tank 238. The upper portion of this tank 238 is connected with line 202 via line 240 and extending from the lower end of this separating tank is conduit 242 which communicates with flash tank 244 and which is provided with a control valve 246. The level is maintained at a desired value in tank 238 by suitably controlling the valve 246 and the water passing through line 242 is reduced in pressure in flash tank 244 and is suitably cooled by injection cooler 248 so as to convert it to water and convey it to the outlet of condenser 220. Any excess steam bypasses intermediate pressure turbine 208 by means of the bypass 250 which is provided with a desuperheater 252 and a control valve 254 and any excess steam bypasses low pressure turbine 216 by means of bypass line 256 which connects with flash tank 244 and is provided with control valve 258. Accordingly, in starting up the unit and in operating at low loads a predetermined minimum flow, as for example, that of 30% load, is passed through the steam generator as previously mentioned. The various bypasses are then in operation and the excess steam bypasses high pressure turbine 200 by flowing through the line 230, tank 238 and line 240 while the excess steam bypasses turbines 208 and 216 by flowing through the respective bypasses 250 and 256. The valves associated with each of the bypasses are controlled by means of the control system of the invention.

When a so-called hot start-up of the power plant is made, i.e., when the plant is restarted after having been in operation for some time and the period that the plant has been idle is not sufficient for the superheater surface to cool to a relatively low temperature additional precaution must be taken to insure that the superheater surface which is comprised of a large mass of tubing, is not subject to an unduly fast cooling as a result of relatively low temperature steam flow through it during the start-up process. Accordingly an extraction system is provided which consists of conduit 262 connected with conduit 184, with this conduit 262 leading to the separating tank 238 and with this extraction system being designed to remove some of the steam that leaves the transition section 182 so that the amount of steam flowing through the superheater at low loads during a hot start will be regulated as desired.

To illustrate the operation during hot start, let it be assumed that below 30% load the flow through the economizer water heating surface and transition section is maintained at that required for 30% load. However, below 15% load the flow through the superheaters 190A and 190B and 192A and 192B is maintained at that required for 15% load. Accordingly from zero to 15% load the extraction system bypasses a quantity of steam equal to that required for 15% load. Thus at 15% load and below the flow through the economizer water heating surface and transition section is equal to the flow that is had for 30% load, the flow through the extraction system, i.e., conduit 262 is equal to the flow required for a 15% load and the flow through the superheater is equal to that required for a 15% load. Below 15% load on a hot start the bypass system, i.e., line 230 bypasses the excess steam which flows through the superheater and is not required by the turbine. The flow through the extraction system is controlled by extraction valve 264 and as the load increases on hot start from 15 to 30% load this extraction valve progressively closes so that the flow through the superheater surface is equal to that required for the particular load above 15% and accordingly from 15 to 30% load the flow through the extraction system decreases from a flow equivalent to that provided at 15% load to a zero flow at 30% load.

This operation of the extraction system is graphically depicted in FIG. 3A. In this illustration the ordinant of the curve is extraction flow in percentage of the feedwater flow or flow of the heated medium through the steam generator as related to maximum load with 100% being the flow provided at maximum load. The abscissa of the curve is load in percentage. It will be seen that below 15% load the extraction flow is 15% and from 15 to 30% the extraction flow steadily decreases to zero.

Fuel for firing the furnace of the steam generator is supplied or introduced through a firing system schematically represented and identified as 266 with this firing system including means for feeding and introducing fuel into the furnace of a steam generator together with combustion supporting air. This air is supplied as a result of both the forced draft fan 268 and induced draft fan 270. The forced draft fan, as is conventional, has its outlet connected to duct 272 leading to firing system 266 while the induced draft fan receives combustion gases after they have passed through the steam generator and are ready to discharge to the stack.

In the operation of the steam generator there are numerous parameters which must be controlled throughout the load range over which the power plant operates. These include the pressure in the system and particularly the pressure of the steam supplied to the turbine, the amount of feedwater supplied to the generator, the pressure of the gas or combustion gases within the furnace, the rate of firing of the furnace including the introduction of air thereto. The temperature of the steam supplied to the turbine, the temperature and pressure of the steam exiting from each of the reheaters and supplied to the respective turbines associated therewith. In addition precaution must be taken to accommodate any emergencies such as excess steam temperature and pressures that may develop. The control system of the invention is organized to control these various necessary parameters and the parameters which vary as a function of load have associated therewith control means which are effectively responsive to the output signal of the demand load computer and which is a function of demand load. The control of the invention includes several computer control sub-systems which respond to this demand load signal and effectively compute the desired value of the parameter and this control compares the desired value with the actual value and provides an error signal which is used to do the actual controlling to cause the value of the parameter to coincide with the calculated desired value.

Before describing in detail the several computer control subsystems which respond to the demand load computer, mention should be made of the control console and its relation with the demand load computer as illustrated in the right hand portion of FIG. 3. In this illustration the demand load computer is shown in block form with its various inputs; these being the transformer inputs form bridge network 22, bridge network 132, bridge network 44 and bridge network 54 together with output limit signals and the scheduled interchange signal $L_{ls}$. The demand load computer is shown as connected with the control console so that the various outputs of the computer are received by the console for display, recording and logging purposes. These outputs include $L_{ls}$, $L_1$, $k\Delta f$, $L_M$, $L_{MR}$, and L signals. In addition to receiving these signals from the demand load computer the console receives the signals from the various servos and computers of the other subsystems of the entire computer and from this control console the various inputs for control point adjustment and manual operation are conveyed. The control console acts as a central clearing house or station for these various signals. From the control console the load error signal $(L_{le}+k\Delta f)$ is shown as imparted to the turbine governor valve and the demand load signal L is conveyed to the various control subsystems. These subsystems include the feedwater computer control subsystem, the furnace computer control subsystem, the superheater computer control subsystem, the bypass control subsystem and the reheater computer control subsystem.

Figure 5:
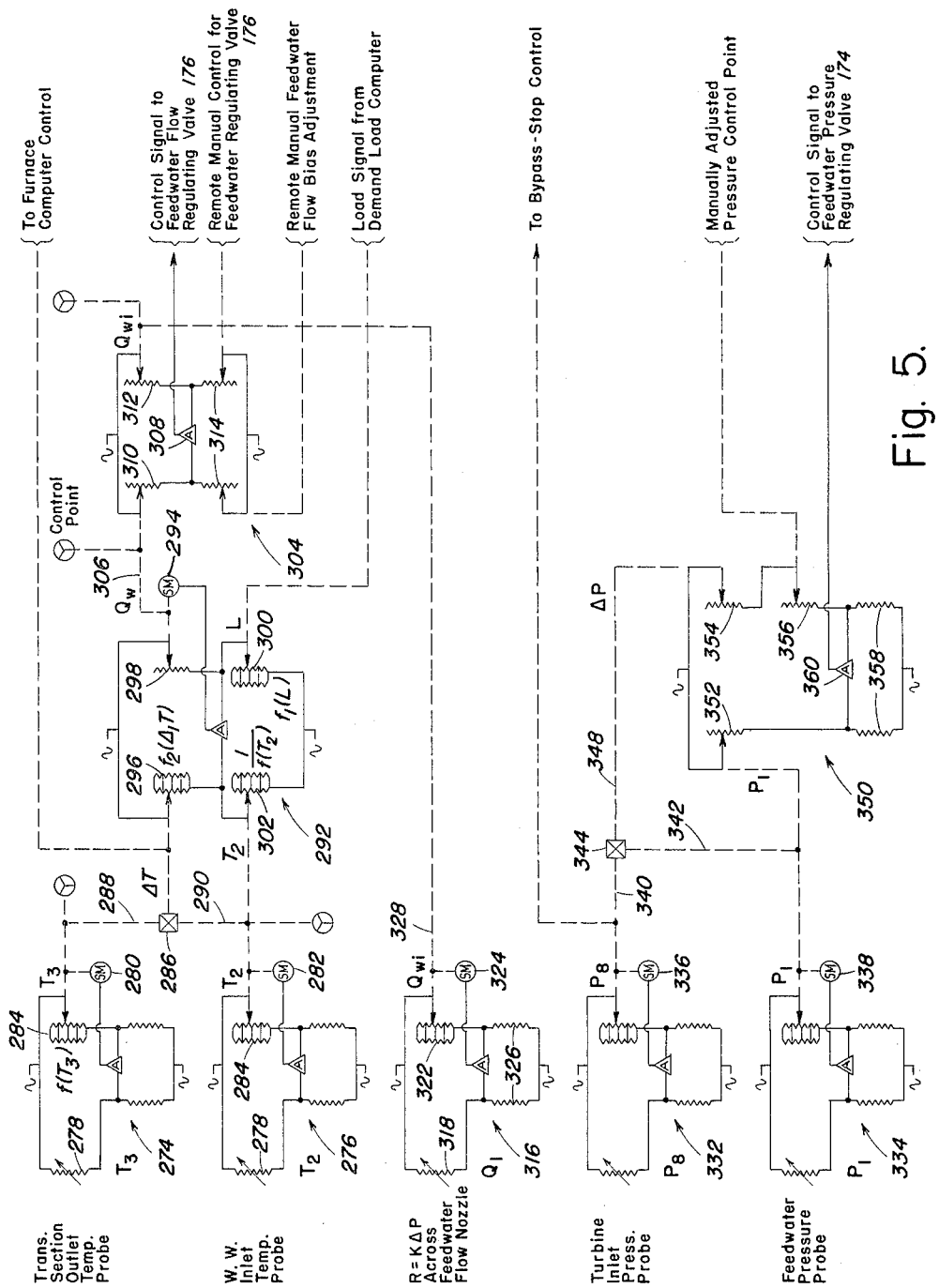
FIG. 5 is a circuit showing the elements and the construction of the feedwater computer subsystem.

Referring now particularly to the feedwater computer control subsystem which is diagrammatically represented in FIG. 5, this subsystem is effective to control the supply of feedwater to the steam generator and the pressure at the outlet of the steam generator, or, in other words, the pressure of steam delivered to turbine 200.

To regulate the feedwater flow the feedwater control subsystem utilizing a computer-type control which in effect is responsive to the heat absorbed by the heated fluid flowing through the water heating surface and the transition section. The amount of heat to be absorbed in these sections for any particular load is a function of the load and accordingly by utilizing this heat absorption and in effect comparing the actual heat absorption with the required heat absorption for the demand load, a reliable control signal and control may be provided. It is noted that in lieu of the heat absorption of the water heating surface and the transition zone together, the heat absorption of either of these may be used or the economizer may be included in the heat absorption function that is utilized. This is the most satisfactory and reliable function for control purposes since the transition outlet temperature is a function of many variables among the most obvious of which are firing rate, type and condition and fuel, soot and ash deposits, excess air, feedwater flow, etc. The heat content of fuel and the soot and ash deposits are difficult if not impossible to measure and transmit to a control system. In addition the effect of these variables is not a readily determined function. Accordingly in the control system these functions are replaced by the heat absorbing function. This is an easily defined function and can be readily monitored. This is readily apparent from the following: Let $T_3$=Steam temperature at transition zone outlet,
$T_2$=Feedwater temperature at waterwall inlet,
$L$=Demand load,
$Q_w$=Feedwater flow at feedwater regulating valve,
$H_1$=Heat absorbed by water and steam in the waterwalls and transition section in unit time.

For any fixed load:

$$T_3 = f(Q_w, H_1, T_2)$$

which in this special case can be represented by $$T_3 = f(Q_w) \times f(H_1) \times f(T_2)$$

However, $$H_1 = f(\Delta_1 T, Q_w) \text{ where } \Delta_1 T = T_3 - T_2$$

which can also be represented by $$H_1 = f(\Delta_1 T) \times f_1(Q_w)$$

Therefore, $$T_3 = f(Q_w) \times f_1(\Delta_1 T) \times f_1(Q_w) \times f(T_2)$$

rearranging and combining terms yields $$Q_w = f(T_3) \times f_2(\Delta_1 T) \times f_2(T_2)$$

Now, as load changes it is required to vary the outlet temperature regulation or $T_3 = f(L)$.

Then for any load (1) $\qquad Q_w = f_1(L) \times f_2(\Delta_1 T) \times f_2(T_2)$ This means, that knowing the load and the temperature rise through the waterwalls and transition section, the required feedwater flow to maintain the desired transition section outlet temperature can be computed. It also means that the transition section outlet temperature can be controlled by feedwater regulation and monitoring. An additional advantage also accrues, by means of monitoring by a differential pressure sensor and flow nozzle placed between the feedwater regulating valve and the economizer inlet since the control is then not hampered by the dynamic response of the boiler, a simplified control loop is utilized, and anticipation is not required. The flow characteristics of the regulating valve are not critical since the loop feedback is through the flow nozzle and any function generation necessary can be easily accomplished in the null detector of the computer control.

To accomplish this control two self-balance Wheatstone bridge networks 274 and 276 are employed. Each of these networks includes a temperature sensor 278 which is of the electric resistance-type. Bridge 274 has its temperature sensor disposed to respond to the temperature of the steam at the location identified as 3 in the diagram of FIG. 3 and which is at the outlet of the transition zone, while the bridge network 276 has its temperature sensor disposed to respond to the water at the zone identified as 2 which is the inlet of the water heating surface. Each of these bridge networks 274 and 276 has its temperature sensor located in the first arm of the respective bridge and in the second arm is disposed a potentiometer driven by a servomotor on the bridge with servomotor 280 being provided with bridge 274 and with servomotor 282 being provided with bridge 276. These potentiometers, which are identified as 284, are loaded so as to provide for linearization of the output of the servomotors in accordance with the Callendar equation $$T = 100 \frac{R_T - R_o}{R_{100} - R_o} + \int \left[ \left( \frac{T}{100} - 1 \right) \frac{T}{100} \right]$$

which relates the international temperatures scale to the platinum resistance temperature sensor or thermometer. Accordingly, the output of servomotor 280 represents or is a function of $T_3$, i.e., the temperature at the location 3, while the output of servomotor 282 responds as a function of $T_2$, i.e., the temperature of the fluid at the location 2. The output of servomotor 280 is fed to differential 286 through shaft 288 and the output of servomotor 282 is fed to the same differential through shaft 290. This differential is effective to subtract these two signals to provide a temperature difference or $\Delta T$ signal as identified in FIG. 5.

The $\Delta T$ signal and the signal representing a function of $T_2$, i.e., the output of servomotor 282, are fed to a computer bridge network 292, (the $\Delta T$ signal is also fed to the furnace computer control subsystem as indicated in FIG. 5 and as will be explained in connection with the description of this subsystem). This computer 292 is a self-balancing Wheatstone bridge and is organized so that when it is driven to balance by the servomotor 294 the bridge solves the following equation which was derived previously—

$$\frac{f_2(\Delta_1 T)}{\frac{1}{f_2(T_2)}} = \frac{Q_w}{f_1}(L)$$

or $$Q_w = f_1(L) \times f_2(\Delta_1 T) \times f_2(T_2)$$

For this purpose bridge 292 has disposed in its first arm a loaded potentiometer 296 which varies as a function of $\Delta T$ and is varied by the $\Delta T$ signal. The second arm of the bridge has a potentiometer 298 which is varied by servomotor 294. The third arm of the bridge has a loaded potentiometer 300 which is varied in accordance with load function signal from the demand load computer as indicated, and the fourth arm of the bridge contains a loaded potentiometer 302 which varies as a function of the reciprocal $T_2$ with this potentiometer being adjusted by means of servomotor 282. Accordingly, computer bridge network 292 is effective to provide an output signal that is a function of the required feedwater flow for the demand load with this signal being output of servomotor 294. This output signal is transferred to the comparator bridge or Wheatstone bridge network 304 via the mechanical transfer connection or shaft 306. This comparator or comparator bridge is a Wheatstone bridge in which is set up the equation $$\frac{Q_w}{K_1} = \frac{Q_w}{K_2}$$

with the output of the amplifier null detector 308 providing a control signal for the motor operated feedwater control valve 176 (FIG. 3) so as to adjust this valve to cause this bridge to rebalance. This comparator bridge in fact compares the required feedwater flow which is represented by the output signal of servomotor 294 with the actual feedwater flow $Q_{wi}$.

The comparator bridge has in its first arm potentiometer 310 which is varied in accordance with signal from servomotor 294 or the required feedwater flow signal $Q_w$. While the second arm of the bridge has a potentiometer 312 which is varied in accordance with a signal which represents, or in other words, is a function of the actual feedwater flow $Q_{wi}$. The third and fourth arms of the bridge each contain a manually adjustable potentiometer 314 for initially setting up the controller and providing a manual regulation if desired.

The signal representing the actual feedwater flow is provided by the bridge network 316 which is a self-balancing Wheatstone bridge which has an element 318 the resistance of which varies in accordance with pressure drop through flow nozzle 320 which is positioned in the feedwater flow line adjacent the outlet side of flow control valve 716. As indicated in FIG. 5, the resistance 318 varies in accordance with $k\Delta P$ and this element 318 is positioned in the first arm of the bridge 316. In the second arm of this bridge is positioned a loaded potentiometer 322 which is adjusted by the rebalancing servomotor 324. While arms three and four of the bridge contain fixed resistance 326. The bridge network is organized so that it transforms an electrical signal linear with differential pressure into a mechanical shaft position which is a function of or proportional to the actual feedwater flow $Q_{wi}$ according to the relationship.

$$Q_{wi} = k\sqrt{\Delta P}$$

Accordingly the output of servomotor 324 is a function of $Q_{wi}$ and this output is transferred through the mechanical connection or shaft 328 to the potentiometer 312 to adjust this potentiometer in accordance therewith. It will thus be seen that a control system is provided which is directly responsive to the demand load on the power plant with the computer control continuously providing a signal that is a function of the difference between the actual feedwater flow and the required feedwater flow for the particular load at any particular time and with this signal being imparted to the motor controlled valve 176 to control the feedwater so as to adjust the feedwater flow so that the actual flow equals the required flow. This control monitors the flow at the outlet of the feedwater flow control valve so that there is an immediate feedback response and no delay due to system dynamics is present in the monitored parameter.

The steam pressure delivered to the turbine at the location identified as 8 in FIG. 3 is controlled by a system which regulates the pressure of the output of the feedwater pump, and as embodied, this control system includes bridge network 332 which responds to the pressure at the location identified as 8, providing an output signal that is a function of this pressure and bridge network 334 which responds to the pressure at the location 1 identified in FIG. 3 and located immediately downstream of the flow nozzle 320. These bridges contain in their first arm a resistance that varies in accordance with pressure at the responsive locations and a potentiometer in the second arm which is repositioned through the null detector amplifier and the respective servomotors 336 and 338, each of which rebalances its respective bridge and provides an output signal that is function of the pressure being measured. The outputs of servomotors 338 and 336 are fed through mechanical means or shafts 340 and 342 to differential 344 which is effective to subtract these signals and provide an output that is a function of the difference in these pressures or $\Delta P$ as indicated with this output being transferred through the mechanical means or shaft 348.

The steam pressure controller includes another bridge network 350 which is operative to provide the output signal to regulate the pressure regulated valve 174 to provide an input or inlet pressure of the feedwater which will in turn, result in the proper steam pressure at the location identified as 8, or in other words, controls $P_8$. This bridge network contains in its first arm a potentiometer 352 that is varied in accordance with $P_1$ and in its second arm are two potentiometers 354 and 356 the former of which is varied in accordance with $\Delta P$ signal (this being the pressure drop through the steam generator from location 1 to location 8) and the latter of which is manually positioned proportional to the desired turbine inlet pressure. Therefore, the resistance of this bridge arm is proportional to $P_8 + \Delta P$, since the potentiometers are in series with $P_8 + \Delta P$ being equal to $P_1$ when the bridge is balanced. The third and fourth arms of this bridge network contain a fixed resistance 358. Accordingly the output of the null detector amplifier 360 is proportional to the error between desired feedwater pressure and measured feedwater pressure and this signal is fed to the motor operated pressure regulator 174 so as to maintain the feedwater pressure at location 1 at the desired value that will cause the steam pressure $P_8$ to remain at its desired value.

This steam pressure control is adaptable for use with variable pressure operation of a power plant which operation is now being considered, i.e., an operation wherein the steam pressure fed to the turbine varies in a predetermined manner with varying load. It is evident that this pressure control may be readily adapted to operate with variable pressure operation from the following At constant load: If $P_8$ = Steam Pressure
$L$ = Load
$P_1$ = Feedwater Pressure
$\Delta P$ = Pressure Drop from Turbine Inlet to Feedwater Regulating Valve and assuming steam temperature is maintained constant then $P_8 + \Delta P = P_1$ For varying pressure operation it is required to change $P_8$ as a function of load so that if the equation $$f_7(L) + \Delta P = P_1$$

is set up in the computer then the error signal will be proportional to feedwater pressure error and can be used to actuate the feedwater pressure regulating valve. The only modification, therefore, required is the addition of a function potentiometer in the control bridge driven by demand load, replacing the manual adjustment or control point setting potentiometer. The manual adjustment potentiometer can be included in one of the fixed arms of the bridge.

FIGURE 5A discloses a modified pressure control circuit that employs or utilizes the demand load signal from the demand load computer. The pressure drop through the unit varies as a function of load, i.e., $f(L)=\Delta P$, and accordingly in the modified arrangement this relationship is utilized. In the arrangement of FIG. 5A a Wheatstone bridge 334' is employed which is identical with previously described bridge 334 with the output of servomotor 338' providing a signal that is a function of $P_1$. This signal is employed in comparator bridge 335 and adjusts the potentiometer 337 in the first arm of this bridge so its resistance varies as a function of $P_1$. The second arm of the bridge in addition to containing the manually adjustable potentiometer 356' contains the loaded potentiometer 339 which is adjusted in accordance with the demand load signal (L) and accordingly the resistance of this potentiometer varies as a function of the demand load. Because of the relationship between load and pressure drop the resistance of the second arm of the bridge varies as a function of the desired $P_1$ for the demand load and this is compared with the actual $P_1$ signal of the first arm so the output of null detector amplifier 341 is a function of the error between the actual and the desired $P_1$ to give the desired $P_3$.

It will thus be seen that the feedwater control subsystem regulates the flow and the pressure of the feedwater delivered to the steam generator with the flow being regulated in response to the demand load on the power plant and with this regulation in effect being accomplished by comparing the actual heat absorption in a particular portion of the steam generator with the required heat absorption in this portion for the particular demand load and with this heat absorption determination being solved by the computer for a determination of the flow error of the feedwater. The feedwater inlet pressure is regulated by the computer means which continuously compares the inlet feedwater pressure with the pressure drop through the generator plus the desired outlet pressure with this comparison providing an error signal when these two factors are not the same so as to regulate the inlet pressure to maintain the desired outlet pressure.

Figure 6:
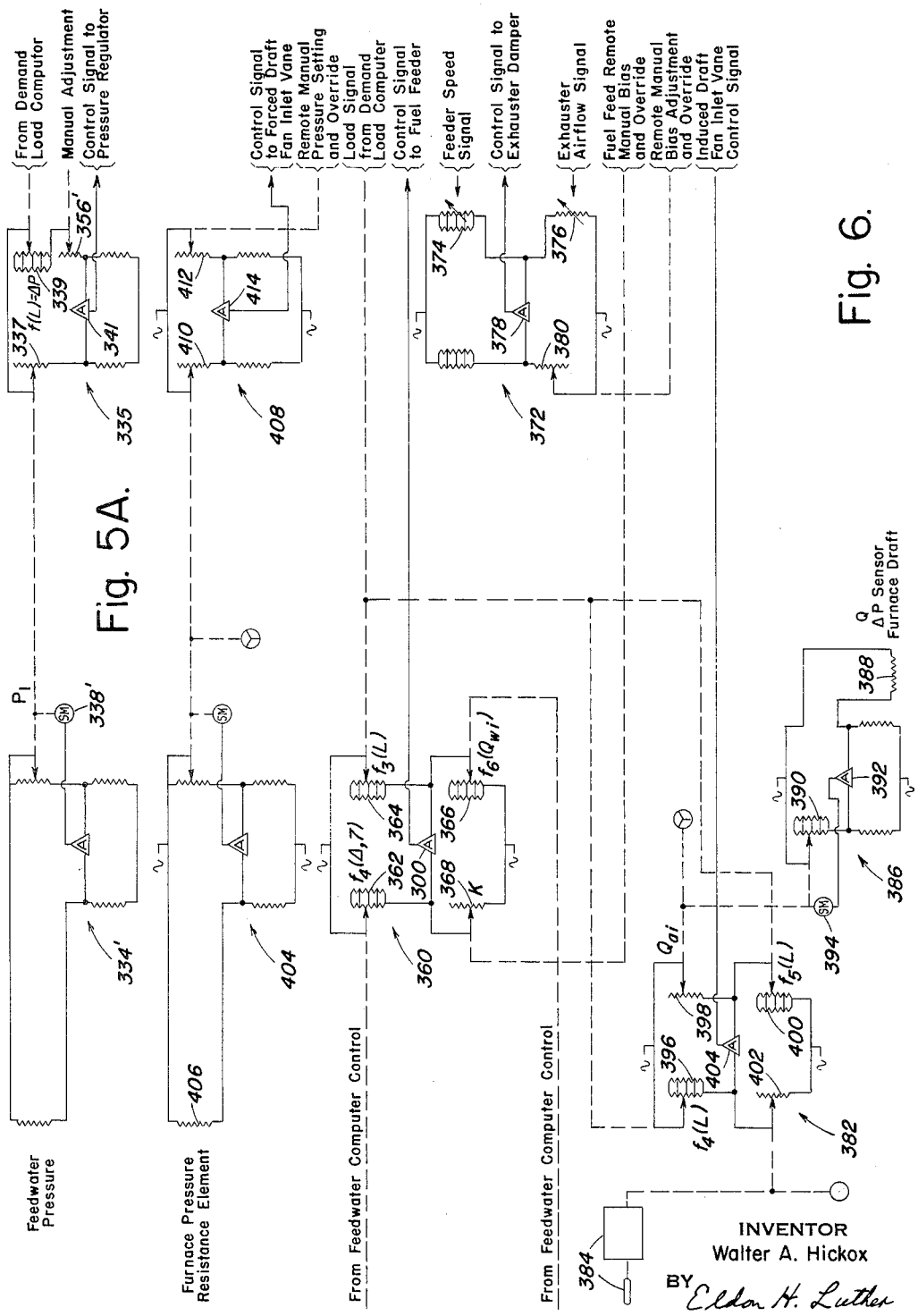
FIG. 6 is a circuit diagram showing the elements and the construction of the furnace computer subsystem.

Considering now the furnace computer control subsystem of FIG. 6, this subsystem is effective to control the forced draft fan to maintain the desired pressure, i.e., gas pressure within the furnace and gas passes of the steam generator, to control the firing rate of the steam generator so as to meet the demand load requirement and to control the induced draft fan so as to regulate the supply of combustion supporting air as required by the demand load and the fuel feed.

The control of the fuel firing rate is based upon a comparison of the actual heat absorbed in a particular portion of the steam generator with the heat absorption requirement of this section as calculated by means of a computer and which responds to the demand load signal with this computer computing the heat absorption requirement for the particular demand load. The heat absorbed is computed from the temperature rise through the particular section of the steam generator, the flow through this section and the load function signal from the demand load computer. The portion of the steam generator utilized for this computation is preferably the same portion utilized in the feedwater computer control subsystem. Accordingly the temperature rise from location 2 to location 3 is used. The flow is determined in the feedwater computer control subsystem.

The absorbed heat computer, which is a Wheatstone bridge, is balanced by using the output of the amplifier to increase the firing rate, the increase in heat absorption being monitored and rebalancing the bridge. Since for any given load the required heat absorption in the waterwall and transition section is known, the required heat absorption, $H_R$ is compared with the measured heat absorption $H_1$ to produce an error signal $$H_R=f_3(L)$$
$$H_1=f(\Delta_1T, Q_{w1}) \text{ or}$$
$$H_1=f_4(\Delta_1T) \times f_5(Q_{w1})$$

It is now required to make $H_1=H_R$ or
$$f_3(L)=f_4(\Delta_1T) \times f_5(Q_{w1})$$

The bridge sets up the following equations and a change in firing rate provides for the equality $$\frac{f_4(\Delta_1T)}{K}=\frac{f_3(L)}{f_5(Q_{w1})}$$

where K is an adjustable constant which provides for a manual override as well as a bias adjustment.

In the illustrative organization of FIG. 6 the bridge for solving this equation is identified as 360. The $\Delta_1T$ was obtained in the feedwater computer control subsystem and accordingly is taken therefrom with this being the temperature difference signal between location 2 and location 3, i.e., from upstream of the water heating system to downstream of the transition section. The $Q_{w1}$ signal (actual feedwater flow) also was determined in the feedwater computer control subsystem and is taken therefrom. This bridge network 360 includes in its first arm loaded potentiometer 362 which is varied by the $\Delta_1T$ signal; in its second arm loaded potentiometer 364 which is varied by the load function signal, in its third arm loaded potentiometer 366 which is varied in accordance with $Q_{w1}$ (actual flow) signal, and its fourth arm manually adjustable resistor 368. The null balance amplifier 370 provides an output signal from the error signal, that is a function of the actual heat absorption as compared with the required heat absorption for the demand load with this signal being utilized in the firing system 266 regulating the speed of the fuel feeder and accordingly the rate of the firing of the fuel. The fuel feeding equipment contemplated is a pulverized fuel feeding system with there being a conventional exhauster on the pulverizer which must be controlled in accordance with the speed of the fuel feeder. For this purpose bridge network 372 is provided with this bridge network continuously providing a comparison of the actual exhauster air flow with the required air flow for the particular speed of the feeder. As identified in FIGURE 6 the first arm of this bridge contains a loaded resistance, the second arm of the bridge contains a loaded potentiometer 374 which varies in accordance with the speed of the fuel feeder, the third arm contains a potentiometer 376 that varies in accordance with the actual air flow from the exhauster and the fourth arm contains a manually adjustable resistor. Null balance amplifier 378 thus provides a signal that may adjust the dampers of the exhauster to regulate the air flow. The fourth arm of this network 372 is manually adjusted for initially setting up control and for override purposes.

The portion of the furnace computer control subsystem for regulating the air flow is a Wheatstone bridge network identified as 382 which sets up a comparison equation between required air flow and measured air flow, modified by load and oxygen ratio, and uses the null detector amplifier signal to control the induced draft fan inlet vanes in order that the change in air flow will rebalance the bridge. Let it be assumed $Q_a$ is the required air flow; $Q_{a1}$ is measured air flow, L is load and X is oxygen ratio, i.e., the ratio of oxygen contained in the flue gas to the remainder of the flue gas.

$$Q_a=f_4(L)$$

multiplying both sides by X $$X \cdot Q_a=f_4(L) \cdot X$$

But required X is a function of load $f_5(L)$ then $$Q_a=\frac{f_4(L) \cdot f_5(L)}{X}$$

Since it is desired to make $Q_{ai}=Q_a$, if we substitute $Q_{ai}$ for $Q_a$ in the bridge the error signal will be a function of air flow error.

The oxygen ratio X is determined by a suitable oxygen analyzer 384 that is disposed in the flue gases exiting from the steam generator with the details of this analyzer not being part of this invention and accordingly are not disclosed. This analyzer provides as its output a mechanical signal which is a function of the oxygen ratio.

The actual air flow is determined by the bridge 386, which is a self-balancing Wheatstone bridge that transforms an electrical signal linear with differential pressure (produced by element 388 disposed adjacent the inlet to the induced draft fan 270) into a mechanical shaft position proportional to the actual flow in accordance with the relationship:

$$Q_{ai}=k_3\sqrt{\Delta P}$$

In addition to element 388 this bridge 386 contains loaded potentiometer 390 and the null detector amplifier 392 which controls operation of the rebalancing servomotor 394 with the shaft output of this servomotor being a function of the actual air flow.

Accordingly, bridge 382 has as its inputs a signal that is a function of load; a signal that is a function of the actual air flow and a signal that is a function of the oxygen ratio. As disclosed, loaded potentiometer 396 is disposed in the first arm of this bridge and is varied in accordance with the load signal. Potentiometer 398 is in the second arm of the bridge and is varied in accordance with the actual flow signal. Loaded potentiometer 400 is disposed in the third arm of the bridge and is varied in accordance with load function signal while potentiometer 402 is in the fourth arm of the bridge and is varied in accordance with oxygen ratio function signal. The unbalance of this bridge is determined by null detector amplifier 404 and produces a signal that is a function of the actual air flow as compared with the required air flow and this error signal is employed to control the effectiveness of the induced draft fan 270, as by means of adjusting the dampers that are conveniently provided with such a fan.

The pressure in the furnace and gas passages of the steam generator is controlled by regulating dampers associated with the forced draft fan 268 and for this purpose there is provided a control system that compares the actual pressure with the control point or desired pressure using a null detector amplifier to position the forced draft fan inlet vanes. In this system bridge 404 is effective to provide an output signal that is a function of the actual furnace pressure with element 406 responding to this pressure. The output signal from bridge 404 is applied to bridge 408 with this bridge continuously comparing the actual furnace pressure as represented by the adjustment of potentiometer 410 with the control point pressure as represented by potentiometer 412 so that the output of the null detector amplifier 414 is a signal that is a function of the differential or error between the actual and the desired pressure and which is employed to adjust the vanes of the forced draft fan.

Accordingly it will be seen that the furnace computer control subsystem controls the firing rate of the steam generator and the oxygen or combustion supporting air supplied in accordance with the demand load on the power plant. With the actual heat absorption in a particular portion of the steam generator being effectively continuously measured and also being effectively continuously computed for the demand load with a comparison of the actual or required heat absorption being continuously provided to produce a control signal for regulating the supply of fuel and with a continual comparison being provided between the actual and required air flow supply to continuously produce a control signal to regulate this supply.

The control for the superheater, i.e., the control for regulating the temperature of the steam delivered from the superheater section of the steam generator to the turbine is also based upon heat absorption functions. The outlet temperature of the superheater is a function of the same variables which effect the transition section outlet temperature plus the additional one of the spray desuperheater flow. To control the temperature of the superheated steam, desuperheaters 416 are provided in lines 186 and 188 (FIG. 3) to control the steam temperature entering the superheater sections 190A and 190B and desuperheaters 419 are provided in lines 186 and 188 to control the temperature of the steam flowing through the superheater sections 192A and 192B. These desuperheaters may be of any conventional type with direct contact desuperheaters being generally employed and wherein water is sprayed directly into the steam to reduce the temperature thereof. Desuperheaters 416 are controlled by motor operated valves 418 while desuperheaters 419 are controlled by motor operated valves 420 with these valves being in the water supply lines to the desuperheaters and being regulated by the computer control subsystem for the desuperheater.

If it is assumed $T_7$=Steam temperature outlet of superheaters 192A and 192B
$T_6$=Steam temperature entering these superheaters,
$H_2$=Heat absorbed by steam in these superheaters in unit time,
$Q_s$=Desuperheater water flow of desuperheaters 419,
$Q_w$=Feedwater flow, for any given load
$T_7=f(Q_w, Q_s, H_2, T_6)$ and
$H_2=f(\Delta_2 T, Q_w)$ where $\Delta_2 T = T_7 - T_6$ also $Q_s=f(T_7)$, or desuperheater water is the temperature modifying function. By rearranging and combining terms and applying the necessary transformations (A) $T_7=f_5(Q_w) \times f(T_6) \times f(\Delta_2 T)$ or (B) $T_6=f_5(Q_w) \times f(T_7) \times f(\Delta_2 T)$ It is required to maintain $T_7$ invariant with load and in addition $Q_w$ is a function of load so these two parameters can be combined to yield the following (C) $T_6=f_2(L) \times f(\Delta_2 T)$ This states that knowing the load and the temperature rise from the desuperheaters to the outlet of the sections 192A and 192B the inlet temperature of these sections can be controlled by means of the desuperheater spray valve and thuse maintain the desired outlet temperature. It should be noted also that since this control system includes the process in the loop the only restriction that needs to be placed on the water requirement function is that it be continuous and have the same sign throughout the load range. Anticipation is also not required and discontinuities and short term transients are compensated for automatically. In both the transition section outlet temperature control and the finishing superheater outlet temperature control the temperature rise function serves to automatically compensate for such unknown variables as fuel heat content, ash deposits, etc.

In the foregoing equation the effect of desuperheater spray water ($Q_s$) on the relationship between feedwater flow and load has been neglected with this being permissive since this effect is not substantial. However, should it be desired to include the effect of the desuperheater spray water it is only necessary to make the following substitutions in the equations identified as A and B:

$$f_1(L)=f_4(L)-f(Q_s)$$
$$f_2(L)=f_5(L)+f(Q_s)$$

In the actual superheater computer control subsystem this substitution would increase the computer complexity by the addition of two potentiometers and one servo, and a flow nozzle transmitter would have to be added to the desuperheater supply line. Since the desuperheater spray effect can be ignored without intolerable error these additional features are not presented in detail in the application.

In the superheater computer control system, signals that are proportional to or a function of the temperatures at the inlet and outlet of finishing superheaters 192A–192B are provided by self-balancing Wheatstone bridges which convert electric signals proportional to the temperture into mechanical shaft positions. The servo driven shafts are used to position potentiometers in the computing bridge networks 434A and 434B. Bridge networks 422A and 422B are provided to produce a signal that is a function of the inlet temperature at superheaters 192A and 192B, i.e., at location 6 in FIG. 3, and bridge networks 424A and 424B are provided to render a signal that is a function of the corresponding outlet temperature of these superheater sections, i.e., at location 7 in FIG. 3. These bridges are generally similar, having a resistance 426 in the first arm that varies in accordance with the temperature at the particular location and a loaded potentiometer 428 in the second arm and which is driven by servometer 430 via null balance amplifier 432 to rebalance the bridge. The third and fourth arms of the bridge networks having fixed resistances therein. The output of servometer 430 is a function of the temperature being measured. These temperature signals are utilized in computing bridge networks 434A and 434B. These networks are arranged to solve the equation identified as C. One arm of each of these bridges contains a loaded potentiometer 436 the value of which varies as a function of the differential temperature across the particular superheater section and this potentiometer is adjusted in accordance with a signal which is a function of this differential temperature. This signal is produced by the mechanical differential device 438 which receives the output signal from the servometer 430 of bridge network 424A or 424B and the output signal of the servomotor 430 of bridge network 422A or 422B with this differential being effective to subtract these two signals and provide an output which is a function of the difference between temperature $T_{6A}$ and $T_{7A}$. The second arm of each of the bridges 434A and 434B contains a fixed resistance 440 which is in effect a proportionality constant. The third arm of the bridge contains a loaded potentiometer 442 the resistance of which varies proportional to the load and this potentiometer is varied by the demand load signal as indicated. The fourth arm of the bridge contains a potentiometer 444 which contains a resistance which varies in accordance with the inlet temperature at the location 6 with the signal that is a function of this temperature being effective to vary this potentiometer. At balance then $$\frac{f(\Delta_2 T)}{T_6} = \frac{K}{f_2(L)}$$

$$T_6 = \frac{1}{K} f(\Delta_2 T) \times f_2(L) \quad \text{(Equation 3)}$$

Ordinarily, in computing $T_6$ this potentiometer would be driven by a servomotor to balance the bridge based upon a signal from the null detector amplifier. However, the right hand side of the equation is always equivalent to required $T_6$ and if the third bridge arm contains measured $T_6$ then the error signal is proportional to the error in $T_6$ and can be used to regulate the amount of spray water introduced. In this manner one null detector amplifier computes as well as controls. If it is desired to have a control point indication of $T_6$ then another bridge circuit will be required. Since the $T_7$ control point is constant no computing servo is required for this parameter.

The radiant sections of the superheater, i.e., 190A and 190B operate and are controlled in a manner generally similar to that of the finishing superheater section 192A and 192B and the previously derived formulas with regard to finishing superheater sections apply to the radiant superheater section with the exception that the actual temperature, i.e., $T_5$ at the outlet of radiant superheater sections 190A and 190B is not a constant value as is $T_7$. Accordingly the previously derived Equation C is necessarily changed to become $$T_4 = f_3(L) \times f(\Delta_3 T) \times f(T_5)$$

The sensing and computing bridge network for the radiant superheater sections 190A and 190B are similar to those previously described in connection with the finishing superheater sections 192A and 192B except that the fixed resistance in the second arm of the computing bridge network for these latter superheater sections is eliminated and a potentiometer which varies in accordance with a function of $T_5$ is substituted. Accordingly temperature sensing bridge networks 446A, 446B, 448A and 448B are similar to the corresponding networks 422A and 422B and the computing networks 450A and 450B are similar to the corresponding networks 434A and 434B with the exception of the loaded potentiometer 452 in the second arm of these bridges and which varies as a function of $T_5$.

The error signal, which is the unbalance detected by the amplifier 454 provided with each of the computing bridges, is a function of the difference between what the inlet temperature to the particular superheater section should be for the demand load and the actual inlet temperature and this signal is effective to operate the respective motor control desuperheater regulating valves to control the flow of water to the desuperheaters and change the actual temperature to a value such that it equals the desired value for the demand load and the error signal is reduced to zero. It will be appreciated that in this control the inlet temperature to the superheaters is the temperature that is being monitored with this temperature being adjacent the desuperheaters so there is no substantial time lag due to system dynamics in the control operation.

As was explained hereinbefore, there is provided upstream of the superheater an extraction system including extraction line 262 and extraction valve 264 for extracting steam in a particular manner during the initiation of a hot start of a steam generator. As was explained, when starting the unit the feed pumps provide a flow of a predetermined value even though the load on the steam generator is below this value. For example, these feed pumps may, from zero to 30% load, maintain the flow at that required for 30% load. During a hot start it is not desirable to convey this large quantity of steam to the superheater so the extraction system is effective to decrease this flow by removing some of the steam prior to reaching the superheaters. When the 30% minimum limit of feed water is employed the extraction system may be operated to extract steam in accordance with the relationship depicted in FIG. 3B. In this figure the flow through the extraction system from zero to 15% load is 15% of the feedwater flow that is provided at 100% load and from 15 to 30% load the flow through the extraction system gradually decreases to zero.

Figure 8:
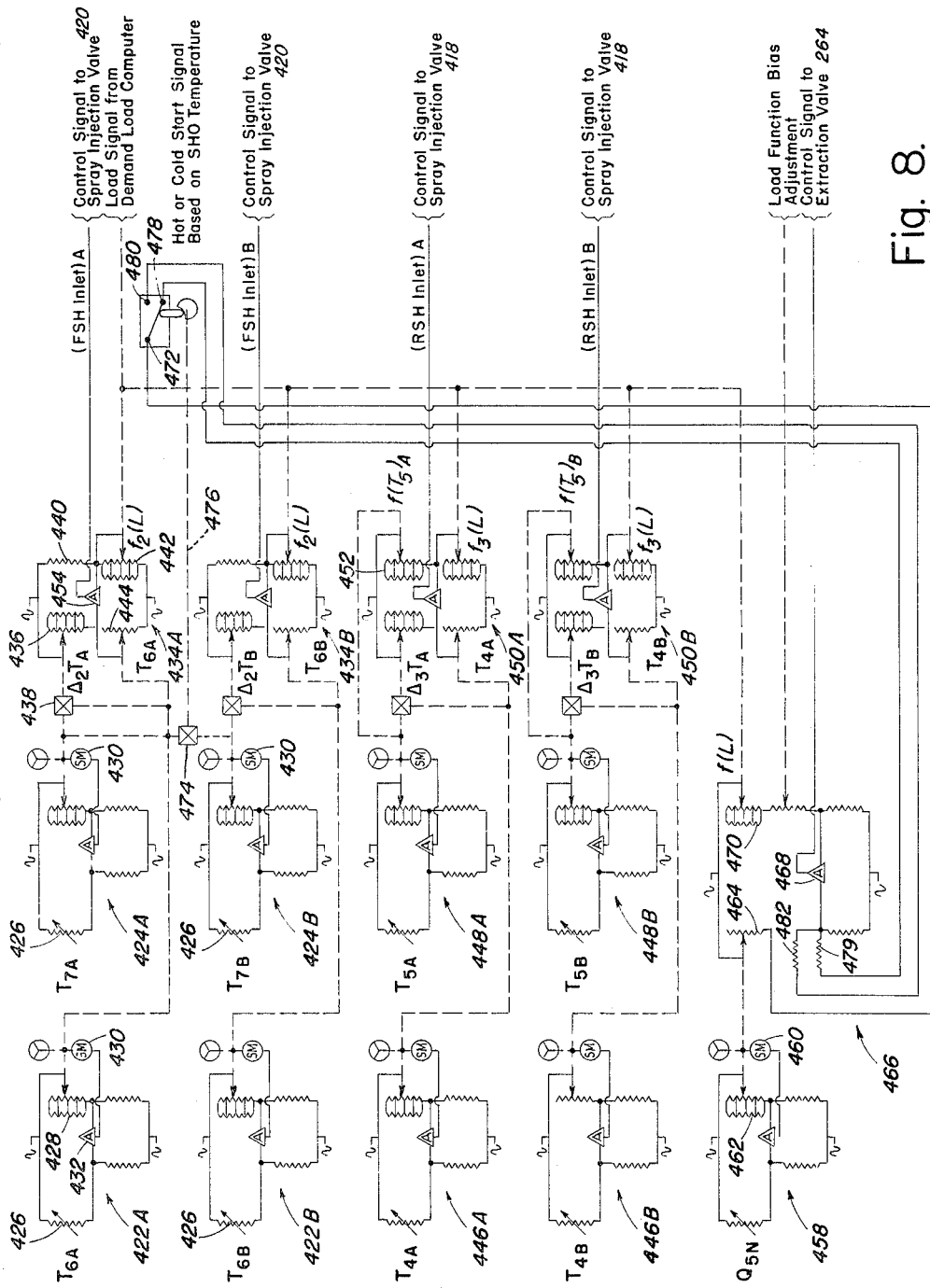
FIG. 8 is a circuit diagram showing the elements and the construction of the desuperheater computer subsystem.

In order to accomplish this control the flow to the superheaters is measured by nozzle 456 (FIG. 3) and associated bridge network 458 (FIG. 8). The bridge network 458 (is a self-balancing Wheatstone bridge network with the shaft output of the servomotor 460 being a function of the steam flow to the superheaters and with this servomotor rebalancing the bridge by adjustment of function potentiometer 462. The output of servomotor 460 also is utilized to position linear potentiometer 464 in the comparator bridge network 466. The potentiometer 464 is in the first arm of the bridge while in the second arm is provided the function potentiometer 470 which varies as and is adjusted in accordance with a function of demand load. The third and fourth arms of this bridge contain fixed resistors. Accordingly the null detector amplifier 468 of this comparator bridge 466 generates a control signal proportional to the difference between the load function and measured flow and which signal operates the motor driven extraction valve 462 to vary the steam flow through flow nozzle 456 to rebalance the bridge.

Since the extraction system is to operate only during hot starts switch 472 is effectively connected into the bridge and is operated by a signal that is a function of the temperature at the location identified as 7 in FIG. 3. For this purpose the outputs of servomotors 430 for the bridge networks 424A and 424B are supplied to the differential 474 and through the mechanical connection 476 operate the switch 472. When the superheater outlet temperature at the location 7 is above a given value switch 472 engages contact 478 connecting resistor 479 in the bridge whereby the bridge will compute the desired function. However, when the temperature $T_7$ falls below this predetermined level the switch is driven to engage contact 480 thereby taking resistor 479 out of the bridge circuit and substitute therefor resistor 482 with this resistor being such that the bridge develops a signal to close the extractor valve 264. Accordingly for cold start the extraction valve is closed while for hot start it operates in accordance with a predetermined function as depicted in FIG. 3B.

During normal operation the superheated steam from the superheater sections passes from the lines 186 and 188 into the steam supply line 198 and to and through the various turbines and reheaters. However, during start up and when abnormal conditions prevail such as low temperature or pressure a bypass system is operated to bypass the steam around the turbines. As previously explained this bypass system includes the bypass line 230 and bypass control valve 234. Also provided are stop valves 194 and 196 which when closed prevent the flow of steam to the turbine. The bypass system is to protect the steam generator and turbine from high pressures and high temperatures with the system having controls so that the bypass valve is opened in response to these conditions in the steam supplied to the turbine. The requirements for control of the bypass valve are all based upon precedence type circumstances which require either opening or closing of the valve and only a small band of control action is required so that in this case valve position is computed.

In the bypass computer control subsystem (FIG. 7) there is provided bridge network 483 which is effective to compute the required valve position. This required valve position is effectively compared with the actual valve position in comparator bridge 484 with the null detector amplifier of this latter bridge generating a signal which is the control signal applied to the motor operated bypass valve 234.

Figure 7:
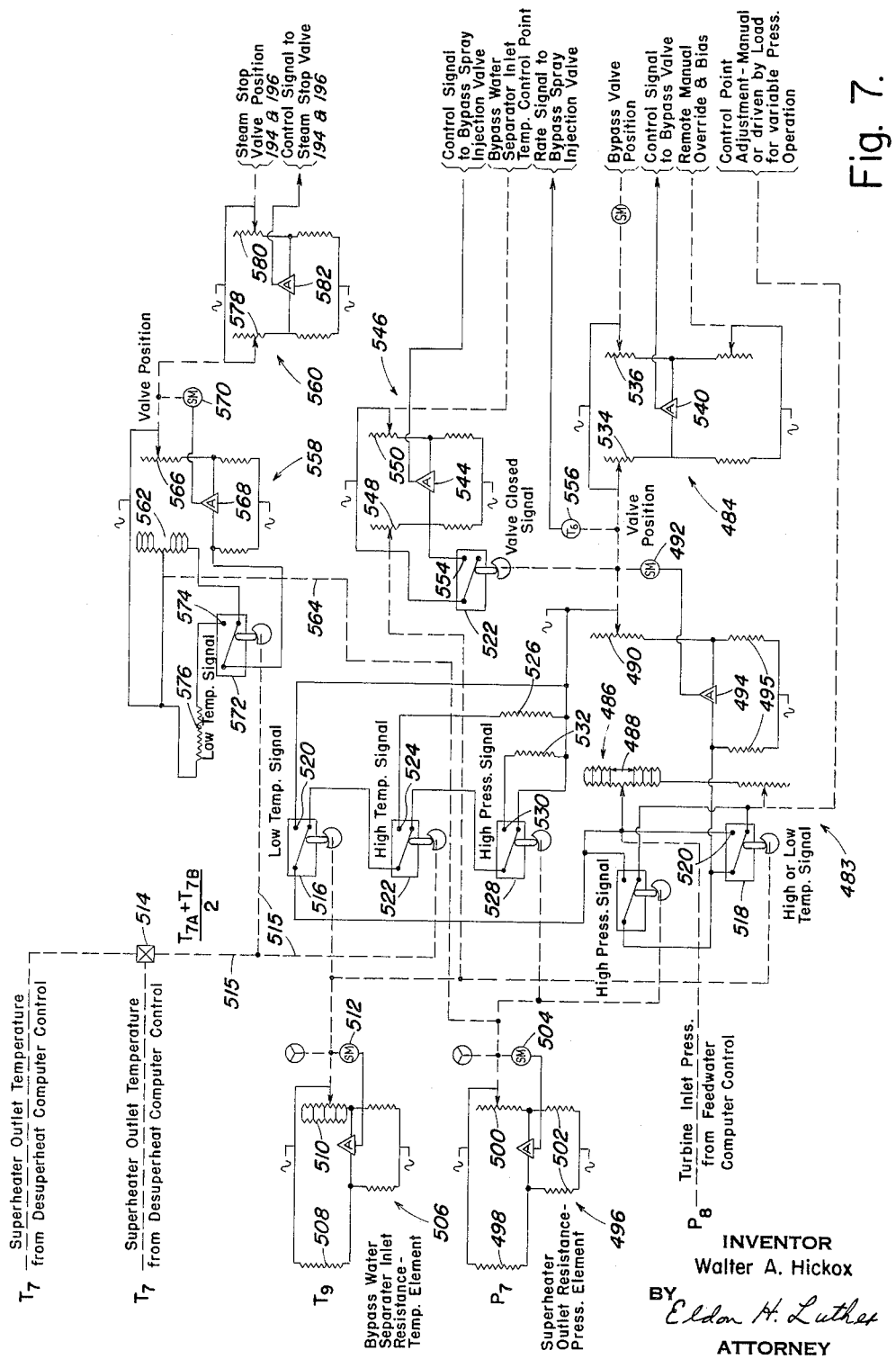
FIG. 7 is a circuit diagram showing the elements and the construction of a bypass and stop control subsystem.

Bridge network 483 has in its first arm loaded potentiometer 486 which is driven in response to turbine inlet pressure $P_8$. Since turbine inlet pressure and superheater outlet pressure under normal conditions will remain in the same ratio, turbine inlet pressure $P_8$ may be used to effect the small amount of regulating action required as well as for opening or closing action in case $P_8$ only exceeds its limits. A signal that is a function of $P_8$ is generated by the self-balancing Wheatstone bridge 332 in the feedwater computer control subsystem and this signal, as identified in FIG. 7, is employed to adjust potentiometer 486. Adjustment of this potentiometer through the range 488 will provide a narrow band of control to regulate valve 234. At the upper end of this band the potentiometer will cause a signal to be generated which will close the valve while at the lower end a signal will be generated which opens the valve. Bridge network 483 has in its second arm servomotor driven potentiometer 490 with this potentiometer being driven by servomotor 492 which responds to the output of null detector amplifier 494 and the third and fourth arms of the bridge contain fixed resistors 495. This servomotor drives the potentiometer 490 to maintain the bridge network balanced with the shaft output of the servomotor providing a continuous signal that is an indication of and a function of the required valve position of the bypass valve 234. In addition to responding to the pressure of the steam delivered to the turbine the bypass control subsystem has three additional requirements imposed upon it with these requirements being listed in the order of their precedence or priority;

1. Bypass valve is to be closed if the high temperature limit of inlet to bypass water separator is exceeded.
2. Bypass valve is to be open if the high temperature limit at the superheater outlet is exceeded.
3. Bypass valve is to be open if the high pressure limit at the superheater outlet is exceeded.

This precedence or schedule of operation is accomplished by five cam actuated switches which effectively remove the potentiometer 486 driven by turbine inlet pressure from the circuit of the bridge. Simultaneously either a short is placed in the bridge for a close signal or a suitable resistance is placed in the bridge for an open signal.

To fulfill these requirements there is provided self-balancing Wheatstone bridge 496 which responds to the outlet pressure of the superheater at the location identified as 7 in FIG. 3 with this bridge containing a resistor 498 in its first arm which varies in accordance with pressure, a servomotor driven rebalancing potentiometer 500 in its second arm and fixed resistors 502 in its third and fourth arms. The rebalancing servomotor 504 provides a signal that varies as a function of $P_7$. There is also provided a self-balancing Wheatstone bridge 506 that responds to the temperature in the bypass system at the location 9 (FIG. 3), or, in other words, adjacent the bypass water separator tank 238. This bridge contains in its first arm a resistance 508 that varies in accordance with $T_9$ and in its second arm a loaded potentiometer 510 which is adjusted by rebalancing servomotor 512 with the output of this servomotor providing a signal that is function of $T_9$. There is also utilized in the bypass control subsystem a signal that is a function of the superheater outlet temperature, i.e., temperature at the location identified as 7 in FIG. 3. To obtain this signal the outputs of the bridges 424A and 424B in the superheater computer control subsystems are utilized with these signals being averaged in the mechanical device 514 so that the position of shaft 515 extending from this device provides a signal that is a function of the superheater outlet temperature or $T_7$.

In controlling the output signal from bridge network 483 the signal from servomotor 512 and which is a function of the temperature at the bypass water separator tank or $T_9$ is effective to override all the other signal inputs to this bridge network to cause the bridge to generate a signal that will result in closing the valve. Servomotor 512 controls switches 516 and 518. When $T_9$ exceeds a predetermined value these switches are actuated so that they are moved from the positions shown in FIG. 7 and into engagement with contacts 520. This shorts the potentiometer 486 and results in a valve closing signal being generated. The next control effect provided by bridge network 483, in order of precedence, is the generation of a signal to open valve 234 if the superheater outlet temperature ($T_7$) exceeds a predetermined value. This is effected by means of switch 522 which is moved from the position shown in FIG. 7 into engagement with contact 524 when this temperature exceeds a predetermined value with actuation of this switch being provided by shaft or mechanical member 515 extending from the averaging device 514. Upon being moved into engagement with contact 524 resistor 526 is placed in series with the potentiometer 486 and is effective to generate a valve open signal. It will be noted that actuation of switch 516 by servomotor 512 effectively takes switch 522 out of the circuit of the bridge network so that the temperature control for the bypass water separator tank overides the temperature control responding to the outlet temperature of the superheater. The bridge network is finally controlled in response to the outlet pressure of the superheater or $P_7$ with a valve opening signal being generated when a predetermined pressure is exceeded. This control is effected by switch 528 which is actuated by servomotor 504 the output of which is a function of $P_7$. When this pressure exceeds a given value switch 528 is actuated from the position shown in FIG. 7 to close contact 530 and thereby connect resistor 532 in series with potentiometer 486 and generate a valve opening signal. Here again it will be noted that switch 516 and also switch 522 are effective, when actuated, to take switch 528 out of the circuit of the bridge network so that both the signal indicative of $T_9$ and the signal indicative of $T_7$ takes precedence over the superheater outlet temperature signal in controlling the output of the bridge network 483.

In addition to the computing valve position and rebalancing bridge network 483 via potentiometer 490 the servomotor 492 also positions potentiometer 534 in comparator bridge 484 with this potentiometer being in the first arm of this bridge. In the second arm of bridge 484 is potentiometer 536 which is positioned by valve position servo 538 so that the output of the null detector amplifer 540 provides a signal which is the error between the desired value and the actual value position and is used to drive the bypass valve to the required new position to balance this comparator bridge 484.

Provided in the bypass line 230 is the desuperheater 236 which, as disclosed, is of the direct contact type wherein water is sprayed into the steam with motor operated valve 542 controlling the supply of water to the superheater. The desuperheater is effective to control the temperature of the steam entering the bypass water sprayer, or in other words, to control $T_9$ and to effect this control valve 542 obtains its control signal from the null detector amplifier 544 of bridge 546 which bridge is effective to compare the actual temperature ($T_9$) with a manually adjusted set point temperature. Bridge 546 contains in its first arm potentiometer 548 which is adjusted by means of servomotor 512 and accordingly varies as a function of $T_9$. The second arm of this bridge contains a potentiometer 550 that is manually adjusted and establishes the control point of $T_9$. The other two arms of the bridge contain fixed resistances. Connected into the network of bridge 546 is switch 554. This switch is actuated by servomotor 492 and is moved from the position depicted in FIG. 7 into engagement with contact 554 when servomotor 492 occupies a position and provides a signal which corresponds to a closing position for valve 243. This actuation of switch 552 alters the configuration of bridge 546, shorting potentiometer 548, so as to provide a signal that causes the spray injection control valve 542 to close whereby this valve will be closed at any time bypass valve 234 is closed. It is also required that anytime bypass valve 234 opens to have the spray injection valve 542 also open as a protection against high temperature. This opening of the spray injection valve in response to opening the bypass valve is accomplished by means of a rate signal produced from the valve position signal generated by servomotor 492. This valve position signal operates tachometer generator 556 with this generator producing a rate signal that is fed to the motor operated injection control valve 542 to open this valve.

In the steam lines leading from the superheater stages, i.e., lines 186 and 188, and downstream of the interconnecting conduit 232, are provided the stop valves 194 and 196, respectively, with these valves being operative to provide a regulation of a limited range and to close when the steam pressure in the outlet of the superheater falls to a predetermined value. In addition the stop valves are closed when the outlet temperature of the superheater falls to a predetermined low value. The control for the stop valves includes computing bridge network 558 (FIG. 7) and comparator bridge 560. In this control system the most stringent requirements are for valve position, pressure regulating being of secondary importance so that it is necessary to compute or generate a signal that is a function of valve position with this being accomplished by bridge network 558. The stop valves are required to regulate below a fixed control point and assume a wide open position when the steam pressure is above a control point. The self-balancing bridge network 558 computes the desired valve position. This bridge includes in its first arm loaded potentiometer 562 which is varied through the mechanical connection or shaft 564 in accordance with the signal from servomotor 504 which is a function of the steam pressure at the outlet of the superheater with the potentiometer 562 providing a tolerance balance within which the stop valves are controlled to regulate the pressure. The second arm of bridge network 558 contains potentiometer 566 which is the valve position potentiometer with the slope of this potentiometer being chosen so that the valve's full range will be the equivalent of the tolerance band allowed on the steam pressure potentiometer 562. The other two arms of the bridge contain fixed resistances. This permits the valve to be driven to either full open or closed position under the desired circumstances without a continuous open or closed signal being applied to maintain the position. Null detector amplifier 568 responds to the bridge unbalance and operates servomotor 570 to readjust potentiometer 566 to balance the bridge with the shaft output of this servomotor providing a signal that is a function of valve position.

In order to generate a signal that will close the stop valves when the temperature of the steam at the outlet of the superheater falls to a predetermined low value switch 572 is provided in the bridge network 558 with this switch being actauted in accordance with the signal representing outlet steam temperature which signal is transmitted to shaft 515. When the temperature $T_7$ reaches the predetermined low value switch 572 moves from the position shown in FIG. 7 into engagement with contact 574 and thereby substitutes for load potentiometer 562 the fixed resistance 576 which is of such a value as to cause servomotor 570 to generate a valve-closed position in rebalancing the bridge. This servomotor 570 in addition to adjusting potentiometer 566 to rebalance bridge 558 also positions potentiometer 578 in comparator bridge 560. The second arm of this bridge contains potentiometer 580 which is positioned by the steam stop valve proportional to the actual valve position. The other arms of this bridge contain fixed resistors so that the output of null detector amplifier 582 provides a signal which is a function of the error of the valve position with this signal being applied to reposition the stop valves 194 and 196 and balance bridge 560.

The reheater computer control subsystem is diagrammatically illustrated in FIG. 9 and is effective to control the outlet temperature of the reheaters 204 and 212 and to control the bypass system for bypassing steam around intermediate pressure turbine 208 and low pressure turbine 216. In the embodiment illustratively shown in the drawings, reheat temperature is controlled by means of, so-called, tilting burners and by means of desuperheating. Tilting burner type of control is well known, being disclosed in U.S. Patent No. 2,363,875 to Kreisinger et al., and involves varying the firing zone or burning fuel mass longitudinally within the furnace by means of tilting the burners and tilt mechanism forming part of the firing system. As this burning fuel mass is moved toward the furnace outlet more heat is available to the reheater and the temperature of the steam leaving the reheaters will increase while an opposite effect is produced by tilting the burners so that the mass is moved away from the furnace outlet.

The computer control for regulating the reheat temperature in effect is based upon heat absorption functions, in effect, comparing the actual heat absorbed with the required heat absorbed in the reheaters for the particular demand load with the differential between these two providing an error signal for regulation. The heat absorption equations are solved for reheater inlet temperature in the computer controls as organized for the reheaters. In the reheater outlet temperature control, burner tilt and spray valve position have no fixed relationship to temperature due to variations in heat absorptions and thus, of these quantities, the only dependable control intelligence which is made use of is temperature, which also determines whether to control by desuperheating or by burner tilt. If it is assumed:

$T_{12}$=Reheater Outlet Temperature of 1st Reheater (204) (which temperature is to remain constant at a desired value),
$T_{11}$=Reheater Inlet Temperature of 1st Reheater 204),
$Q_{RH}$=Steam Flow Through 1st Reheater,
$\Delta_4 T = T_{12}-T_{11}$ or Temperature Rise Through 1st Reheater,
$H_4$=Heat Absorbed by Steam in 1st Reheater in Unit Time, Then
$$T_{12}=f(H_4, T_{11}, Q_{RH})$$
and
$$\Delta H_4 = f(Q_{RH}) \times f(\Delta_4 T)$$
Therefore
$$T_{12}=f(Q_{RH}) \times f(\Delta_4 T) \times f(T_{11}) \times f_1(Q_{RH})$$

Therefore, a computer can be used to predict $T_{12}$ if the other quantities are known. It would be desirable to replace $f(Q_{RH})$ by a function of some other variable in order to eliminate the need for an additional flow nozzle and for this purpose $f_6(L)=f(Q_{RH})$ is a close enough approximation.

Thus
$$T_{12}=f_6(L) \times f(\Delta_4 T) \times f(T_{11})$$
or
$$T_{11}=f_7(L) \times f_1(\Delta_4 T) \times f(T_{12})$$

But it is established that $T_{12}$ must be invariant and therefore
$$T_{11}=f_7(L) \times f_1(\Delta_4 T) \times K$$

This equation is solved and set up by computer bridge network 584. Input signals for this bridge network are generated by the self-balancing Wheatstone bridges 586 and 588 with bridge network 586 having in its first arm element 590 the resistance of which varies in accordance with inlet temperature of the first reheater while in the second arm of this bridge is a loaded potentiometer 592 which is adjusted by servometer 594 in response to the output of null detector amplifier 596. In rebalancing the bridge, servomotor 594 generates a signal that represents or is a function of the temperature at location 11 in FIG. 3, i.e., $T_{11}$. Bridge 588 is similar to bridge 586 but responds to the outlet temperature of the first reheater, i.e., $T_{12}$, with servomotor 598 providing an output signal that represents or is a function of $T_{12}$. The signals from servomotors 594 and 598 are subtracted in differential 600 with the output of shaft 602 providing a signal which is a function of the temperature differential or $f(\Delta_4 T)$.

The first arm of computer bridge 584 contains potentiometer 604 which is adjusted in accordance with output of servomotor 594 and accordingly in accordance with $T_{11}$. The second arm contains a loaded potentiometer 606 which is adjusted in accordance with demand load signal output of the demand load computer and accordingly is a function of the demand load. The third arm of the bridge contains manually adjustable potentiometer 608 for controlling the set point and bias override, while the fourth arm of the bridge contains a loaded or non-linear potentiometer 610 which is adjusted in accordance with the $f(\Delta_4 T)$ signal of shaft 602. When the bridge is in balance the following relationship or equality is established.

$$\frac{T_{11}}{f_1(\Delta_4 T)}=\frac{F_7(L)}{\frac{1}{K}}$$

or $$T_{11}=xf_7(L) x f_1(\Delta_3 T) xK$$

If the bridge is unbalanced the error signal measured by the null detector amplifier is proportional to temperature error and is used to actuate the burner tilt driver or spray injection valve. In this manner reheater outlet temperature errors are predicted and anticipatory control action results.

There are several additional requirements imposed upon this control. The most desirable situation exists when the outlet temperature can be controlled by burner tilt only and therefore the spray control valve 612 for desuperheater 614 under normal conditions is required to remain closed until the tiltable burners are driven to their lower limit, conversely, when the temperature regulating range of the spray valve is exceeded (valve closed and outlet temperature is too low) the control must be transferred to burner tilt drive. In addition if the high temperature limit is exceeded even though the burner tilts are not at their lower limit the spray valve must open and participate also in temperature regulation. Two servos are shown which essentially repeat burner tilt and spray valve position and by means of cams operate limit switches thereby effect the desired control transfer. In this arrangement synchro 615 follows burner tilt position and the output of amplifier 618 actuates servomotor 620 in accordance with burner tilt position with this motor in turn actuating the cam operator for switch 622. When the burners are tilted to their lowermost position so that the burner tilt is at the ends of its control range switch 622 is moved from the position shown in FIG. 9 into engagement with contact 624 thereby transferring the control from burner tilt to the desuperheater 614 and with the output signal of computer bridge 584 then being effective to adjust the motor operated injection spray valve 612. In order that the control will be transferred back to the tilting burners when desuperheater control no longer is required, switch 626 is provided with this switch being moved into engagement with contact 628 when the spray valve is in the closed position. Thus, this switching arrangement establishes that the initial control of reheat temperature is by tilting burners and desuperheat control is used only when the limit of tilting burner control has been reached. This is the control action that is used for normal operation.

However, should the outlet temperature of the reheater exceed a predetermined value, it is desirable that both tilting burner and desuperheat control be simultaneously provided and for this purpose switch 626 is provided which is effective to connect the output of the null detector amplifier of computer bridge 584 with the motor operated spray valve simultaneously with its connection to the burner tilt control. It is noted that switch 626 is cam operated in response to the position of the spray valve in the same manner that switch 622 is operated in response to burner tilt with synchro 630, amplifier 632 and servomotor 634 being effective for operating switch 626.

The control for the output temperature of the second reheater, i.e., reheater 212 is the same as that for the first reheater with this control including self-balancing Wheatstone bridge 636 which provides a signal that is a function of the inlet temperature $T_{14}$ of reheater 212 and self-balancing bridge 638 providing a signal that is a function of the temperature $T_{15}$. Computer bridge network 640 solves the previously derived equation for the second reheater utilizing the intelligence produced by the bridges 636 and 638 and the output signal of this computer bridge 640 is employed in the same manner as the output from computer bridge 584 to control the burner tilt and the spray water injection control valve 643 for desuperheater 645 as the burner tilt and desuperheater is controlled in the first reheater. The elements of the control for the second reheater 212 that regulate the transfer of control from burner tilt to desuperheating are the same as those for the control for the first reheater and are identified by the same numbers with the addition of a prime (′) thereto.

Accordingly the reheater computer control effectively controls the outlet temperatures of each of the reheaters with each of the controls effectively responding to the heat absorption in the reheater solving the heat absorption equation for the inlet temperature required for the particular demand load to which the power plant is operating and comparing this with the actual or measured temperature thereby developing an error signal which is employed to balance the particular control arrangement utilized to regulate the reheat temperature with the particular regulating means being independent of the firing rate. It will be understood that the regulating means for the superheater steam temperature is also independent of the firing rate and that a regulating arrangement other than those disclosed may be employed, for example in lieu of burner tilt and/or desuperheating the superheat and/or reheat temperature may be controlled by gas recirculation control system wherein combustion gases are recirculated or introduced into the furnace of the steam generator with this being a conventional and well known method or way of controlling steam temperature, be it reheat or superheat steam temperature; or bypass damper type of control system may be used wherein a gas pass is placed in parallel with all or a portion of the superheater or reheater exchange surface, with dampers regulating the flow through the bypass as well as over the heat exchange surfaces with this also being a conventional and well known type of steam temperature control for both superheat and reheat temperature.

Each of the turbines receiving reheated steam, i.e., turbines 208 and 216, has associated with it a bypass system to bypass steam around these turbines with this system being utilized in the start up of the power plant and when abnormal conditions develop. The bypass system associated with turbine 208 includes bypass 250 and control valve 254 as well as desuperheater 252 while the bypass associated with turbine 216 includes bypass line 256 and control valve 258 disposed therein. The bypass control valves are regulated primarily in response to the pressure at the outlet of the associated reheater with valve 254 being regulated in response to the pressure at location 12 in FIG. 3 and valve 258 being regulated in response to the pressure at location 15 in FIG. 3. The control system for each of these valves is the same and are identified in FIG. 9 with each system including self-balancing Wheastone bridge 642 which responds to the particular pressure and is provided with a rebalancing servomotor 644 the shaft output of which provides a signal that is a function of the particular pressure. This servomotor in addition to positioning the rebalancing potentiometer 643 in each of the bridges 642 also positions the linear potentiometer 646 in the comparator bridge 648. Since reheater outlet pressure is a function of load there is provided in the second arm of each of the bridges 648 the non-linear or loaded potentiometer 650 which sets up a load function for the control reference and is driven by the signal from the demand load computer, i.e., the demand load signal. Accordingly the output of the null detector amplifier 652 provides a signal which indicates the variation of the actual pressure from the desired pressure for the demand load so that when the actual pressure exceeds the desired pressure by a predetermined value the particular bypass valve will be actuated, i.e., either valve 254 or 258.

In the bypass system for turbine 208 the desuperheater 252 is controlled in response to the outlet temperature at the desuperheater so as to maintain this temperature within given limits. The control for this temperature also includes a self-balancing Wheatstone bridge identified as 654 (FIG. 9) and a comparator bridge 656. The rebalancing servomotor 658 of bridge 654 provides a signal that is a function of the outlet temperature of desuperheater 252 and this servomotor positions the linear potentiometer in bridge 656. The temperature function represented by the adjustment of this potentiometer is compared in this bridge to the position of the manually adjusted potentiometer 662 in the second arm of the bridge with this latter potentiometer generating the resistance analog of the desired control point and is thus manually adjustable. The output of null detector amplifier 664 of bridge 656 accordingly represents an error signal that is the difference between the actual and the set point temperature and is utilized as a control signal for operation of the motor operated spray water injector valve 666 and thereby controls the temperature of the steam leaving the desuperheater.

It should be noted that in the several figures depicting circuit diagrams that the dotted lines represent mechanical signals or signals transmitted mechanically as by a rotating shaft of servomotors. Also in these diagrams the synchros identified as 668 are for the purpose of generating a voltage that is a function of the mechanical signal position and are operated by the mechanical means that produces a signal representing a particular parameter with this voltage being utilized for the purpose of indicating the particular parameter of which the signal is a function. These signals are transmitted to the control console as indicated in the bottom lefthand portion of the console for dispatching and distribution to the necessary indicating instruments.

It will thus be appreciated that with the invention there is provided a completely integrated electronic computer-type control system for control of a power plant which is connected into and forms part of an electric power plant system, with the control effectively responding to the demand load on the plant and controlling in response to demand load the various parameters that vary in accordance with and as a function thereof. The control system effectively computes various parameters that are controlled and monitors these parameters with the arangement being such that the monitored parameters and the computer parameters are relatively disposed so that there is no large or long time delay due to system dynamics in detecting the effect of the applied control action but rather a rapid detection is provided whereby a more stable, accurate and smooth operating control organization develops. Moreover, by utilizing the process loop much of the complicated and extraneous equipment as employed with conventional power plant control arrangements is eliminated and the hunting and inaccuracy of these systems is greatly reduced.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. An electric generating power plant having a turbo-generator, a steam generator supplying the motive power to said turbo-generator, a demand load computer continuously providing a signal that is a function of demand load on the plant, means responsive to the temperature of the heated fluid leaving a predetermined section of the heat exchange surface of the steam generator and effective to continuously provide a signal that is a function of said temperature, means responsive to the temperature of this fluid entering said section continuously providing a signal that is a function of this temperature, differential means receiving these signals and effective to continuously provide a signal that is a function of the difference between the first two mentioned signals, a self balancing electrical bridge network the resistance of one arm of which is varied by said difference signal and in accordance with a function of the difference of said temperatures, the resistance of another arm is varied by the signal that is a function of the inlet temperature and in accordance with a function of this temperature, the resistance of a third arm being varied by the demand load signal and in accordance with a function of the demand load, the resistance of the fourth arm being adjustable by a null balance servo to balance the bridge with the bridges being arranged so the adjustment of this fourth arm provides a signal that is a function of the required flow of the heated fluid through the heat exchange section for the demand load, means providing a signal that is a function of the actual flow through said section, an electrical bridge effective to continuously compare the signal representing a function of the required flow and the signal representing a function of the actual flow and provide an output signal that is a function of the difference between the required flow and the actual flow, means responsive to this last named signal and effective to control the flow so the actual flow equal the required flow.

2. In an electric generating power plant system wherein a number of separate electric generating plants are interconnected for power interchange by tie-lines with the power interchange being scheduled and with each plant including a turbo-generator and a steam generator supplying the motive power therefore and with each plant being required to take care of load changes in its own predetermined area, the system of controlling each plant comprising, means providing a signal that is a function of the variation of the actual interchange from the required interchange, means providing a signal that is a function of the variation of the frequency of the power plant system from a predetermined desired frequency, means combining these signals in a manner that they effectively cancel each other if the changes were produced by a load change outside the area of the particular plant but are added if the changes were produced by a load change within the area of the particular plant or by a change in scheduled interchange, means providing a signal that is a function of the output of the plant to its predetermined area, said combining means combining this signal with the other two so that a signal that is a function of demand load on the particular plant is produced, means providing a signal that is a function of the inlet and outlet heated fluid temperature of a predetermined portion of the heating surface of the steam generator, and means providing a signal that is a function of the actual fluid flow through said portion, computer means receiving the aforementioned signals as input intelligence and effective to continuously provide an output signal that is a function of the difference between the required flow for the demand load and the actual flow, means for regulating said fluid flow in response to said output signal and in a manner so the measured flow equals the required flow and the error signal is reduced to zero whereby the flow regulation is directly and continuously responsive to demand load.

3. In an organization of the type described including an electric generating plant system having a plurality of separate electric power plants interconnected for electric power interchange by tie lines with each plant having a turbo-generator unit supplied with motive power by a steam generator, a demand load computer providing a signal that is a function of demand load on the plant, means providing a signal that is a function of the inlet and outlet heated fluid temperatures of a predetermined portion of the heating surface of the steam generator and means providing a signal that is a function of the actual fluid flow through said portion, computer means receiving the aforementioned signals as input intelligence and effective to continuously provide an output signal that is a function of the difference between the required flow for the demand load and the actual flow, means for regulating said fluid flow in response to said output signal and in a manner so the measured flow equals the required flow and the error signal is reduced to zero whereby the flow regulation is directly and continuously responsive to demand load, a feed pump for supplying this medium to the generator, means responsive to the pressure of vapor leaving the generator and supplied to the turbine and producing a signal that is a function of the pressure, means responsive to the pressure of this medium entering the generator and producing a signal that is a function thereof, computer means responsive to these signals and effective to produce a signal that is a function of the difference between the actual pressure of the medium entering the generator and the desired pressure, and pressure regulator means effective to regulate the pressure of the entering medium in response to the last named signal to make the actual pressure equal to the desired pressure.

4. In a power plant system wherein a number of separate electric generating plants are interconnected for power interchange by tie-lines with the power interchange being scheduled and with each plant including a turbo-generator and a steam generator supplying the motive power therefor and with each steam generator having tubular heat exchange surface including a superheater portion and being required to take care of load changes in its own predetermined area, the system of controlling each plant comprising means providing a signal that is a function of the variation of the actual interchange from the required interchange, means providing a signal that is a function of the variation of the frequency of the power plant system from a predetermined desired frequency, means combining these signals in a manner that they effectively cancel each other if the changes were produced by a load change outside the area of the particular plant but are added if the changes were produced by a load change within the area of the particular plant or by a change in scheduled interchange, means providing a signal that is a function of the output of the plant to its predetermined area, said combining means combining this signal with the other two so that a signal that is a function of the demand load on the particular plant is produced, means providing a signal that is a function of the inlet and outlet steam temperatures of a predetermined portion of the superheater, computer means receiving the aforementioned signals as input intelligence and effective to continuously provide an output signal that is a function of the difference between the required inlet steam temperature for the demand load and to give a predetermined outlet steam temperature and the actual inlet steam temperature, means responsive to this output signal effective to regulate the inlet steam temperature and independent from the firing rate of the steam generator with this regulation being operative to maintain the outlet steam temperature at its desired value.

5. In an electric generating power plant installation a once-through type steam generator connected with and supplying superheated steam to a turbo-generator, said steam generator including a superheater and means to force the heated medium through the circuit of the steam generator, said means being effective to force a predetermined amount therethrough below a certain load, means to withdraw a portion of this flow immediately upstream of the superheater during hot start up in accordance with a predetermined function with relation to load and control to control this withdrawal, this control means including means providing a signal that is a function of load on the plant, means providing a signal that is a function of the flow entering the superheater and computer means receiving these signals as input intelligence and effective to provide an output signal that is a function of the difference between the actual flow entering the superheater and the flow required in accordance with said predetermined function and means regulated in response to this last named signal operative to control the withdrawing means in accordance therewith.

6. The organization of claim 5 including means responsive to the temperature of the heated medium entering the superheater effective to cause the computer to generate a signal to prevent withdrawal of a portion of a portion of the said flow when this temperature exceeds a predetermined value.

7. The organization of claim 6 wherein the computer means comprises an electric bridge network, and a switch associated with this network and operated by the temperature responsive means effective to change the resistance of the network in response to the temperature exceeding said predetermined value.

8. In an electric generating power plant installation operating on the reheat cycle and wherein a steam generator supplies the motive power to a turbo-generator said steam generator being fired with a suitable fuel and including means for reheating steam, a bypass system for bypassing the steam leaving the reheating means around the turbine when the pressure thereof drops substantially below what it should be for the particular load, means providing a signal that is a function of the steam pressure at the outlet of the reheating means, means providing a signal that is a function of the steam pressure at the outlet of the reheating means, means providing a signal that is a function of the demand load on the plant, an electric bridge having as input intelligence these two signals and effective to provide an output signal that is a function of the difference between the actual pressure at this location and the required pressure for the load, means responsive to this output signal to control said bypass system causing the system to open when this difference exceeds a certain value and close when it is less than this value.

9. In an electric generating power plant installation wherein a steam generator supplies superheated steam to a turbo-generator such steam generator including a steam superheater portion the combination of a demand load computer providing a signal that is a function of the demand load on the plant, means utilizing this signal and effectively responsive to the required heat absorption of this superheater portion and the actual heat absorption thereof, this last named means being operative to continuously provide a control signal that is a function of the difference between this required and actual heat absorption, and means independent of the firing rate of the steam generator to control the temperature of the steam egressing from the superheater portion, this last named means being regulated in response to said difference signal whereby said temperature is maintained at its desired value and the regulation of the temperature is directly responsive to the demand load.

10. An electric generating power plant comprising a turbo-generator, a steam generator connected with said turbo-generator to supply the motive power therefor, said steam generator being fired by suitable fuel and including in its heat absorption surface a superheater heat exchange portion for heating steam generated by the steam generator, a control system operative to maintain the temperature egressing from this superheater at a generally constant value with varying loads on the power plant, this last named system including a demand load computer providing an output signal that is a function of the demand load on the plant, means providing a signal that is a function of the steam temperature entering the superheater, means providing a signal that is a function of the steam temperature leaving the superheater, computer means receiving the aforesaid signals as input intelligence and effective to continuously provide an output signal that is a function of the difference between the required input temperature for the load and to give the desired output temperature and the actual input temperature, means operative to control said input temperature independent of the firing rate of the steam generator, this last named means being regulated in response to the output signal of the computer means whereby the inlet temperature of the superheater is regulated as required to give the desired outlet temperature with this regulation being directly responsive to the demand load.

11. The organization of claim 10 wherein the means to control said input temperature independent of the firing rate comprises a desuperheater.

12. An electric generating power plant comprising a turbo-generator, a steam generator connected with said turbo-generator to supply the motive power therefor, said steam generator being fired by suitable fuel and including in its heat absorption surface a superheater heat exchange portion for heating steam generated by the steam generator, a control system operative to maintain the temperature egressing from this superheater at a generally constant value with varying loads on the power plant, this last named system including a demand load computer providing an output signal that is a function of the demand load on the plant, means providing a signal that is a function of the steam temperature entering the superheater, means providing a signal that is a function of the steam temperature leaving the superheater, computer means receiving the aforesaid signals as input intelligence and effective to continuously provide an output signal that is a function of the difference in the required heat absorption in the superheater heat exchange portion and the actual heat absorption means effective to control this heat absorption independent of the firing rate of the steam generator and means operative to adjust this control means in response to the output signal of the computer means to maintain the output temperature of the superheater heat exchange portion generally constant with varying load.

13. In an electric generating power plant system including a turbo-generator associated with a once-through steam generator which supplies motive power thereto, means for forcing the heated medium through the circuit of the steam generator which circuit includes a superheater portion, means to withdraw a portion of the heated medium immediately prior to this superheater portion during hot start up and in a programmed manner with relation to load, a demand load computer continuously providing a signal that is a function of demand load on the plant, means utilizing this signal and effectively responsive to the required heat absorption of a predetermined portion of the heat exchange surface of the steam generator and the actual heat absorption thereof and operative to continuously provide a control signal that is a function of the difference between the flow of fluid through said section as required for the demand load and the actual flow with the flow required below a certain load being constant and means controlled in response to said signal to make the actual flow equal the required flow, means providing a signal that is a function of the flow entering the superheater, computer means responsive to this last named signal and the demand load signal and effective to provide an output signal that is a function of the difference between the actual flow entering the superheater and the desired flow in accordance with the programmed relation to load, and means regulated in response to this last named signal operative to control the withdrawing means in accordance therewith.

14. In a power plant system of the type described including a once-through steam generator including a superheater, a bypass system operative to bypass steam egressing from the superheated around the turbine, a valve in said bypass to control the operation of the bypass, an electrical bridge network operative to provide an output signal to control said valve, servo motor means adjusted in response to the pressure of the steam entering the turbine and effective to adjust a potentiometer in an arm of said network, this potentiometer being loaded so as to produce a narrow control band at one end of which a closed and at the other end of which an open valve control signal is developed by the network, said servo adjusting the potentiometer to cause the bypass control valve to open when the turbine inlet pressure exceeds a predetermined value.

15. The organization of claim 14 wherein the bypass system includes a desuperheater, an electrical bridge network providing an output signal to control said desuperheater and means responsive to the temperature of the effluent from the desuperheater to regulate said network so the temperature is maintained within a predetermined range.

16. The organization of claim 15 including a separator tank downstream of the desuperheater and means responsive to the temperature of the steam entering said tank and effective to adjust the first mentioned network to cause the valve in the bypass to close when this temperature exceeds a predetermined value.

17. The organization of claim 14 including means effectively responsive to the pressure of the steam leaving the superheater and effective to adjust said network to cause the valve in the bypass to open when this pressure exceeds a predetermined value.

18. In electric generating power plant installation operating on the reheat cycle and wherein a steam generator supplies the motive power to a turbo-generator said steam generator being fired with a suitable fuel and including means for reheating steam, a control system operative to maintain the temperature egressing from this reheating means at a generally constant value over a predetermined load range on the power plant, this last named system including a demand load computer providing a signal that is a function of the demand load on the plant, means providing a signal that is a function of the steam temperature entering the reheating means, means providing a signal that is a function of the steam temperature leaving the reheating means, an electrical bridge network receiving as input intelligence these several signals and with the electrical balance of the network varying as a function of the difference between the required input temperature for the load and to give the desired output temperature and the actual input temperature and accordingly an electrical output signal that varies as a function of the difference, means operative to control said input temperature independent of the firing rate of the steam generator, this last named means being regulated in response to the balance of said network whereby the inlet reheating is regulated as required to give the desired outlet temperature with this regulation being directly responsive to the demand load.

19. The organization of claim 18 wherein the means operative to control the inlet temperatures of the reheating means includes two independent systems, means operative to cause one such system to effect the necessary control of the inlet temperature in the upper portion of the load range and maintain the other system inactive and means operative to cause the other system to effect the necessary control of the inlet temperature in the remaining portion of said load range and maintain said one system inactive.

20. The organization of claim 19 wherein an electric circuit is connected with the bridge and the control systems to control the inlet temperature of the reheating means independent of the firing rate to transmit the output signal from said bridge to these systems, switch means in this circuit operated in response to adjustment of said systems in effecting their control operation, said switch interrupting the transmission of the bridge output signal to said other system and permitting the transmission thereof to said one system during the upper portion of the load range and interrupting the transmission to said one system and permitting the transmission to the other system in response to the one system having been moved to a predetermined portion of the extent of its control range.

21. The organization of claim 20 wherein the one system comprises tilting the burners of the furnace longitudinally thereof and the other system comprises a desuperheater upstream of the reheating means relative to steam flow.

22. An electric generating power plant comprising a turbo-generator, a steam generator connected with said turbo-generator to supply the motive power therefor, said steam generator being fired by suitable fuel and including in its heat absorption surface a superheater heat exchange portion for heating steam generated by the steam generator, a control system operative to maintain the temperature egressing from this superheater at a generally constant value with varying loads on the power plant, this last named system including a demand load computer providing a signal that is a function of the demand load on the plant, means providing a signal that is a function of the steam temperature entering the superheater, means providing a signal that is a function of the steam temperature leaving the superheater, an electrical bridge network receiving as input intelligence these several signals and with the electrical balance of the network varying as a function of the difference between the required input temperature for the load and to give the desired output temperature and the actual input temperature, means operative to control said input temperature independent of the firing rate of the steam generator, this last named means being regulated in response to the balance of said network whereby the inlet temperature of the superheater is regulated as required to give the desired outlet temperature with this regulation being directly responsive to the demand load.

23. In an electric power plant installation of the type described having a steam generator supplying superheated steam to a turbo-generator the combination of means responsive to demand load on the plant effective to produce a signal that is a function of demand load, the steam generator having a furnace, means introducing fuel into the furnace for burning therewith, heat exchange means forming part of the steam gnerator arranged to absorb heat produced by the burning fuel, and through which the heated medium of the steam generator is conveyed, computer means responsive to the demand load signal and other parameters of the medium flowing through the heat exchange means and effective to continuously provide a signal that is a function of the difference between the required heat absorption of said heat exchange means for the demand load and the actual heat absorption and means responsive to this last named signal and effective to regulate the feeding of fuel to the furnace to cause the actual absorption to equal the required absorption.

24. In an electric generating power plant installation including a steam generator connected with and supplying steam to a turbo-generator at a predetermined pressure, means continuously providing a signal that is a function of demand load on the plant, and means operative to maintain the pressure of the steam delivered to the turbine at a desired value, this last mentioned means including means responsive to the feedwater inlet pressure and a signal that is a function of the pressure drop through the steam generator and operative to drop a signal that is a function of the difference between the actual inlet pressure and the desired inlet pressure to give the desired steam pressure at the turbine and means responsive to this difference signal and operative to regulate the inlet pressure to make the actual equal the desired.

25. In an electric generating power plant installation including a steam generator connected with and supplying steam to a turbo-generator at a predetermined pressure, means continuously providing a signal that is a function of demand load on the plant, and means operative to maintain the pressure of the steam delivered to the turbine at a desired value, this last named means including means operative to produce a signal that is a function of the feedwater inlet pressure to the steam generator, computer means responsive to this last named signal and the demand load signal and operative to produce an output signal that is a function of the difference between the actual inlet pressure and the desired inlet pressure to the steam generator to give the desired outlet pressure for the demand load and means responsive to this output signal and operative to regulate the inlet pressure to make the actual value equal the desired value.

26. In an electric generating power plant system including a power plant having a turbo-generator associated with a steam generator the method of regulating feedwater flow in the steam generator comprising continuously providing a signal that is a function of demand load on the power plant, continuously measuring the inlet and the outlet temperature of the heated medium in a portion of the vapor generator and providing signals that are a function of these measured values, continuously measuring the flow of the heated medium at a location such that it is a predetermined function of the flow through said portion of the steam generator, continuously providing from these signals a signal that is a function of the difference between the required flow of the heated medium for the demand load and the actual flow, and regulating said flow in accordance with said signals.

27. In an electric generating power plant installation having a turbo-generator, a supercritical steam generator supplying the motive power therefor, said steam generator including in its heat exchange surface a water heating and transition section, means responsive to and continuously providing a signal that is a function of the outlet temperature at said section, means responsive to and continuously providing a signal that is a function of the inlet temperature of said section, means continuously providing a signal that is a function of the demand load on the power plant, means continuously providing a signal that is a function of the actual flow through said section, computer means including an electrical bridge network receiving as input intelligence said signals and continuously providing an output signal that is a function of the difference between the required flow through said section for the demand load and the actual flow and means regulated in response to this output signal and effective to control said flow to make the actual equal the required.

28. In a power plant installation of the type described a steam generator including a superheater, said generator supplying superheated steam to a turbo-generator, stop valve means in the steam supply line to the turbine, means for controlling the stop valve including an electrical bridge network having a potentiometer in one arm of one branch actuated in response to the pressure at the outlet of the superheater, said potentiometer being loaded and operative in one position to cause the control means to close the stop valve and in another position to cause the control means to open the stop valve with the potentiometer between these positions being effective to cause the control means to regulatingly adjust the valve between open and closed position, said Wheatstone bridge being self-balancing, a servo motor associated with the bridge to rebalance the same with the rebalancing adjustment being a function of desired value position, and another Wheatstone bridge one arm of one branch of which has a potentiometer adjusted by said servo motor and another arm of one branch being a potentiometer adjusted in accordance with actual valve position and with the arms of this latter bridge being arranged so the output of the bridge is an error signal representing the error between desired and actual valve position.

29. In a power plant installation of the type described a steam generator including a superheater, said generator supplying superheated steam to a turbo-generator, stop valve means in the steam supply line to the turbine, means for controlling the stop valve including an electrical bridge network having a potentiometer in one arm of one branch actuated in response to the pressure at the outlet of the superheater, said potentiometer being loaded and operative in one position to cause the control means to close the stop valve and in another position to cause the control means to open the stop valve with the potentiometer between these positions being effective to cause the control means to regulatingly adjust the valve between open and closed position, a resistance in shunt with said potentiometer and switch means operative to switch said resistance out and the potentiometer in the circuit in one position and the potentiometer out and the resistance in the circuit in another position, means responsive to the temperature of the steam leaving the superheater and operative to cause this switch means to move from said one to said other position when the temperature falls below a desired value and from said other to said one when it rises above a desired value, said resistance being such that when in the circuit of the bridge network the control causes the valve to close.

30. In an electric generating power plant system wherein a number of separate electric generating plants are interconnected for electric power interchange by tie-lines with the power interchange being scheduled and with each plant including a turbo-generator and a steam generator supplying motive power therefor and each plant being required to take care of load changes in its own predetermined area, the system for controlling each plant comprising a self balancing bridge network responding to a change in interchange, and having a rebalancing servo the movement of which is a function of the change in interchange, a mechanical differential having as inputs the signal from said servo and a signal representing a function of scheduled interchange and the output of which is the difference between these two signals and provides a signal that represents a function of interchange error, another self balancing bridge network responding to the electrical output of the plant distributed to the plant area and having a rebalancing servo the movement of which provides a signal that is a function of the actual area output of the plant, a third self balancing bridge network responding to the variation in frequency of the power plant system from a predetermined valve and having a rebalancing servo the movement of which provides a signal that has a predetermined relation both in magnitude and sense with the interchange error of said differential and mechanical differential means combining these three signals with the interchange and frequency error signals cancelling each other when the load change causing these errors is outside the plant area and these signals being additive when this load change is in the plant area so the combined signal is a function of demand load on the plant and accordingly a signal that is a function of demand load is produced, means responsive to and continuously providing a signal that is a function of the inlet temperature of a predetermined portion of the heating surface of the steam generator, means responsive to and continuously providing a signal that is a function of the outlet temperature of said portion, the flow through said portion of the heat exchange surface being a predetermined proportion of the feedwater supplied to the steam generator, means continuously providing a signal that is a function of the actual feedwater flow to the steam generator, computer means including an electrical bridge network receiving as input intelligence the signal representing a function of demand load, the signals representing a function of said temperatures and the signal representing a function of actual feedwater flow, said computer means continuously providing a signal that is a function of the difference between the required feedwater flow and the actual feedwater flow and means regulated in response to this last named signal effective to cause the actual to equal the required.

31. In a power plant installation a vapor generator adapted to supply vapor under substantial pressure to a turbine, said generator including heat exchange tubes through which the heated vaporizable medium is conveyed, means including feed pump means for supplying this medium to the generator, means responsive to the pressure of vapor leaving the generator and supplied to the turbine and means producing a signal that is a function of this pressure, means responsive to the pressure of this medium at an initial portion of the vapor generator and producing a signal that is a function thereof, computer means responsive to these signals and effective to produce a signal that is a function of the difference between the actual pressure of the medium entering the generator and the desired pressure, and pressure regulator means effective to regulate the pressure of the entering medium in response to the last named signal to make the actual pressure equal the desired pressure.

32. In an electric generating power plant system wherein a number of separate electric generating plants are interconnected for electric power interchange by tielines with the power interchange being scheduled and with each plant including a turbo-generator and a steam generator supplying motive power therefor and each plant being required to take care of load changes in its own predetermined area, the system for controlling each plant comprising a self balancing bridge network responding to a change in interchange and having a rebalancing servo the movement of which is a function of the change in interchange, a mechanical differential having as inputs the signal from said servo and a signal representing a function of scheduled interchange and the output of which is the difference between these two signals and provides a signal that represents a function of interchange error, another self balancing bridge network responding to the electrical output of the plant distributed to the plant area and having a rebalancing servo the movement of which provides a signal that is a function of the actual area output of the plant, a third self balancing bridge network responding to the variation in frequency of the power plant system from a predetermined value and having a rebalancing servo the movement of which provides a signal that has a predetermined relation both in magnitude and sense with the interchange error output of said differential and mechanical differential means combining these three signals with the interchange and frequency change error signals cancelling each other when the load change causing these errors is outside the plant area and these signals being additive when this load change is in the plant area so the combined signal is a function of demand load on the plant whereby a signal that is a function of demand load is produced, means responsive to the temperature of the heated fluid having a predetermined section of the heat exchange surface of the steam generator and effective to continuously provide a signal that is a function of said temperature, means responsive to the temperature of this fluid entering said section continuously providing a signal that is a function of this temperature, differential means receiving these signals and effective to continuously provide a signal that is a function of the difference between the first two mentioned signals, a self balancing electrical bridge net work the resistance of one arm of which is varied by said difference signal and in accordance with a function of the difference of said temperatures, the resistance of another arm is varied by the signal that is a function of this inlet temperature and in accordance with a function of this temperature, the resistance of a third arm being varied by the demand load signal and in accordance with a function of the demand load, the resistance of the fourth arm being adjusted by a null balance servo to balance the bridge with the bridge being arranged so the adjustment of this fourth arm provides a signal that is a function of the required flow of the heated fluid through the heat exchange section for the demand load, means providing a signal that is a function of the actual flow through said section, an electrical bridge effective to continuously compare the signal representing a function of the required flow and the signal represeting a function of the actual flow and provides an output signal that is a function of the difference between the required flow and the actual flow, means responsive to this last named signal and effective to control the flow so the actual flow equals the required flow.

33. In an electric generating power plant system including a turbo-generator associated with a once-through steam generator which supplies motive power thereto, means for forcing the heated medium through the circuit of the steam generator which circuit includes a superheater portion, means to withdraw a portion of the heated medium immediately prior to this superheater portion during hot start-up and in a programmed manner with relation to load, a demand load computer providing a signal that is a function of demand load on the plant, means providing a signal that is a function of the inlet and outlet heated fluid temperatures of a predetermined portion of the heating surface of the steam generator and means providing a signal that is a function of the actual fluid flow through said portion, computer means receiving the aforementioned signals as input intelligence and effective to continuously provide an output signal that is a function of the difference between the required flow for the demand load and the actual flow, means regulating said fluid flow in response to said output signal and in a manner so the measured flow equals the required flow and the error signal is reduced to zero whereby the flow regulation is directly and continuously responsive to demand load, the required flow being such that it is constant below a predetermined load, means providing a signal that is a function of the flow entering the superheater, computer means responsive to this last named signal and the demand load signal and effective to provide an output signal that is a function of the difference between the actual flow entering the superheater and the desired flow in accordance with the programmed relation to load, and means regulated in response to this last named signal operative to control the withdrawing means in accordance therewith.

34. In an electric generating power plant installation a vapor generator adapted to supply vapor under substantial pressure to a turbine, said generator including heat exchange tubes through which the heated vaporizable medium is conveyed, means including feed pump means for supplying this medium to the generator, means responsive to the pressure of vapor leaving the vapor generator and supplied to the turbine and producing a signal that is a function of the pressure, means responsive to the pressure of this medium entering the generator and producing a signal that is a function thereof, differential means effective to produce a signal that is a function of the difference between these two signals, an electrical bridge network, means operative to vary the resistance of one of the legs in accordance with said difference signal, means operative to vary resistance of another leg in accordance with the signal that is a function of the entering pressure, said electrical bridge being arranged so the unbalance thereof is a function of the difference between the actual inlet pressure and the necessary inlet pressure to give the desired outlet pressure, means producing a signal in accordance with the unbalance of the bridge, and regulator means effective to regulate the pressure entering medium in response to the last named signal to make the actual pressure equal the necessary pressure.

35. In a steam generator installation supplying superheated steam at elevated temperature to a turbine the method of controlling the pressure of the steam leaving the generator and delivered to the turbine comprising continuously providing a signal representing a function of the outlet pressure of the generator, continuously providing a signal representing the inlet pressure of the feedwater as supplied to the vapor generator, continuously providing a signal that is a function of the difference between these signals, by means of this last mentioned signal and the signal representing a function of the inlet pressure continuously providing a signal that is a function of the difference between what said inlet pressure actually is and what it should be to give the desired outlet pressure and regulating the inlet pressure in accordance with this last mentioned signal to make said actual inlet pressure equal the desired pressure.

36. In an electric power plant installation of the type described having a steam generator supplying superheated steam to a turbo-generator the combination of means responsive to demand load on the plant effective to produce a signal that is a function of demand load, the steam generator having a furnace, means introducing fuel into the furnace for burning therewithin, heat exchange means forming part of the steam generator arranged to absorb heat produced by the burning fuel and through which the heated medium of the steam generator is conveyed, means providing a signal that is a function of inlet temperature of the heated fluid to the heat exchange means, means providing a signal that is a function of the outlet temperature of the heated fluid from the heat exchange means and means providing a signal that is a function of the actual flow of the heated fluid through said heat exchange means, computer means responsive to the demand load signal and these last mentioned signals and effective to continuously provide an output signal that is a function of the difference between required heat absorption by this heat exchange means for the demand and the actual heat absorption, means responsive to this output signal and effective to regulate the feeding of fuel to the furnace to cause the actual absorption to equal the required absorption.

37. In an electric generating power plant installation wherein a steam generator, fired with a suitable fuel, supplies motive power to a turbo generator unit the method of regulating fuel feed to the steam generator comprising providing a signal that is a function of demand load on the plant, providing signals that are functions of the temperature of the temperature of the heated medium entering and leaving a portion of the steam generator and the actual flow of the heating medium therethrough, respectively, utilizing these signals as input data to continuously provides a signal that is a function of the difference between the heat required to be absorbed by this portion for the demand load and the heat actually absorbed and regulating the fuel feed to the steam generator in accordance with this last named signal so the actual absorption equal the required absorption.

38. In an electrical generating power plant installation, a steam generator connected with and supplying superheated steam to a turbo-generator as the motive power therefore, said steam generator having a furnace which is fired with a suitable fuel and into which, together with the fuel, is introduced combustion supporting air, means responsive to demand load on the plant effective to produce a signal that is a function of the demand load, the steam generator having a furnace, means introducing fuel into the furnace for burning therewithin, heat exchange means forming a part of the steam generator arranged to absorb heat produced by the burning fuel and through which the heated medium of the steam generator is conveyed, means providing a signal that is a function of inlet temperature of the heated fluid to the heat exchange means, means providing a signal that is a function of the outlet temperature of the heated fluid from the heat exchange means, means providing a signal that is a function of the actual flow through the heat exchange means, computer means responsive to the demand load signal and these just named signals and effective to continuously provide an output signal that is a function of the difference between required heat absorption by this heat exchange means for the demand load and the actual heat absorption, means providing a signal that is a function of the actual flow of the combustion supporting air to the furnace of a steam generator, means providing a signal that varies in accordance with the ratio of the oxygen to the remaining portion of the combustion gases traversing the steam generator, computer means responsive to the aforesaid oxygen ratio signal, air flow signal and demand load signal, and operative to continuously provide an output signal that is a function of the difference between the actual air flow and the required air flow for the demand load, means responsive to the first mentioned output signal and effective to regulate the feeding of fuel to the furnace causing the actual heat absorption in the heat exchange means to equal the required heat absorption and means responsive to the second mentioned output signal and effective to regulate the supply of combustion supporting air to the furnace to cause the actual flow thereof to equal the required flow.

39. In an electric generating power plant installation including a fuel fired steam generator associated with and supplying the motive power for a turbo-generator the combination of a demand load computer providing a signal that is a function of the demand load on the plant, means providing a signal that is a function of the inlet and outlet heated fluid temperature of a predetermined portion of the heating surface of the steam generator and means providing a signal that is a function of the actual fluid flow through said portion, a first computer means receiving the aforementioned signals as input intelligence and effective to continuously provide an output signal that is a function of the difference between the required flow for the demand load and the actual flow, a second computer means receiving these said signals as input intelligence and effective to continuously provide an output signal that is a function of the difference between the required heat absorption of this predetermined portion of the heating surface of the steam generator for the demand load and the actual heat absorption, means for regulating said fluid flow through said portion of the heating surface in response to the first mentioned output signal and effective to cause the actual flow to equal the required flow and means for regulating the supplying of fuel to the steam generator in response to the second mentioned output signal and effective to cause the actual heat absorption of said heating surface portion equal the required heat absorption.

40. In an electric power plant installation of the type described, a steam generator supplying superheated steam to a turbo-generator, the steam generator having a furnace into which fuel is introduced and burned, means for supplying fuel to the furnace, heat exchange means forming part of the steam generator and arranged to absorb heat produced by the burning fuel with the heated medium of the steam generator being conveyed through this heat exchange means, the steam generator having a steam superheater portion, means responsive to the demand load on the plant effective to produce a signal that is a function of demand load, a first computer means responsive to the demand load and other parameters of the medium flowing through the heat exchange means and effective to continuously provide a signal that is a function of the difference between the required heat absorption of this heat exchange means for the demand load and the actual heat absorption, a second computer means responsive to the demand load signal and other parameters of the medium flowing through the steam superheater portion and effective to continuously provide a signal that is a function of the difference between the required heat absorption of this superheater portion for the demand load and the actual heat absorption, means responsive to the signal of said first computer means and effective to regulate the feed of fuel to the furnace to cause the actual heat absorption to equal the required heat absorption in said heat exchange means, and means responsive to the signal of said second computer means effective to regulate the temperature of the steam leaving the steam superheater portion.

41. An electric generating power plant comprising a fuel-fired steam generator associated with and supplying the motive power for a turbo-generator said steam generator being fired by a suitable fuel and including heat exchange surface comprised of tubular elements, a control system for controlling the operation of the steam generator in accordance with the demand load on the plant said system including means providing a signal that is a function of the demand load on the plant, means providing signals that are respectively, a function of the inlet and outlet heated fluid temperature of a predetermined heat exchange surface of the steam generator, means providing a signal that is a function of the actual flow through said portion with this flow being a predetermined function of the total feed water flow to the steam generator, a first computer means receiving the aforementioned signals as input intelligence and effective to continuously provide an output signal that is a function of the difference between the required flow for the demand load and the actual flow, a second computer means receiving these signals as input intelligence and effective to continuously provide an output signal that is a function of the difference between the required heat absorption of this predetermined portion of the heat exchange surface of the steam generator for the demand load and the actual heat absorption, means providing a signal that is a function of the steam temperature entering said superheater, means providing a signal that is a function of the steam temperature leaving said superheater, a third computer means receiving these last mentioned signals and the demand load signal as input intelligence and effective to continuously provide an output signal that is a function of the difference between the required input temperature for the demand load and to give a desired output temperature and the actual input temperature, means operative to regulate the feedwater flow to the steam generator and accordingly the flow through said heat exchange portion with this means being regulated in response to the output signal of the first computer means and effective to cause the actual flow therethrough to equal the required flow, means for regulating the supply of fuel to the steam generator in response to the output signal of the second computer means and effective to cause the actual heat absorption for the demand load to equal the required, and means operative to control the inlet temperature of the steam entering the superheater independent of the firing rate of the steam generator, with this last mentioned means being regulated in response to the output signal of the third computer means and effective to control the inlet temperature in a manner so as to give the desired outlet temperature.

References Cited by the Examiner

UNITED STATES PATENTS

| | | | |
|---|---|---|---|
| 2,433,725 | 12/1947 | Ziebolz | 290—2 |
| 2,537,902 | 1/1951 | Ludwig | 230—2 |
| 2,681,418 | 6/1954 | Bristol | 290—2 |
| 2,831,125 | 4/1958 | Cohn | 290—4.1 |
| 2,861,194 | 9/1958 | Bristol | 307—57 |
| 2,895,056 | 7/1959 | Bristol | 307—57 |
| 2,902,831 | 9/1959 | Ipsen et al. | 122—406 |
| 2,909,672 | 10/1959 | Emery. | |
| 2,949,541 | 8/1960 | Addie et al. | 290—40 |
| 2,962,598 | 11/1960 | Larew | 290—4.1 |
| 2,977,768 | 4/1961 | Wagner et al. | 60—67 |
| 2,999,638 | 9/1961 | Brownlee | 235—151 |

FOREIGN PATENTS 771,715    4/1957    Great Britain.

OTHER REFERENCES

Electrical Review, November 13, 1959, pp. 635–642.

Power (Design and Equipment Application Section), May 1959, pp. 64–65.

ORIS L. RADER, *Primary Examiner.*

MILTON O. HIRSHFIELD, *Examiner.*

G. SIMMONS, R. C. SIMS, *Assistant Examiners.*

UNITED STATES PATENT OFFICE
CERTIFICATE OF CORRECTION

Patent No. 3,244,898                                    April 5, 1966

Walter A. Hickox

It is hereby certified that error appears in the above numbered patent requiring correction and that the said Letters Patent should read as corrected below.

Column 3, line 14, for "error signal)" read -- (error signal) --; column 4, line 15, for "$+k_5 . \int \frac{d}{dt} f_1 (X)$" read -- $+k_5 \delta \frac{d}{dt} f_1 (X)$ --; line 66, for "in" read -- is --; column 5, line 35, for "$(21_e I_L)$" read -- $(2I_e I_L)$ --; column 14, line 45, for "$+\int [$" read -- $+\delta [$ --; column 15, line 46, for "716" read -- 176 --; line 57, for "$Q_{wi}=k\sqrt{\Delta P}$" read -- $Q_{wi}=k3\sqrt{\Delta P}$ --; column 16, line 59, for "$P_i$=Feedwater Pressure" read -- $P_1$=Feedwater Pressure --; column 19, line 42, for "conveniently" read -- conventionally --; column 20, line 54, for "thuse" read -- thus --; column 21, line 4, for "nozzle transmitter" read -- nozzle and transmitter --; line 9, for "system" read -- subsystem --; line 40, for "servometer" read -- servomotor --; lines 57 to 60, between the top and bottom equation insert -- or --; column 27, line 16, for "204)" read -- (204) --; column 32, line 69, for "control to control" read -- control means to control --; column 33, lines 8 and 9, for "of a portion of a portion of said" read -- of a portion of said --; column 34, line 67, for "superheated" read -- superheater --; column 36, line 38, for "therewith" read -- therewithin --; column 38, line 40, for "valve" read -- value --; lines 45 and 46, for "frequency error" read -- frequency change error --; column 41, line 26, for "demand and" read -- demand load and --; lines 36 and 37, for "of the temperature of the temperature of the heated" read -- of the temperature of the heated --.

Signed and sealed this 5th day of September 1967.

(SEAL)
Attest:

ERNEST W. SWIDER                                EDWARD J. BRENNER
Attesting Officer                               Commissioner of Patents